United States Patent
Ohmi et al.

(10) Patent No.: US 9,955,028 B2
(45) Date of Patent: Apr. 24, 2018

(54) IMAGE-PROCESSING APPARATUS AND IMAGE-PROCESSING METHOD

(71) Applicant: PFU Limited, Kahoku-shi, Ishikawa (JP)

(72) Inventors: Kunihiko Ohmi, Ishikawa (JP); Kazunori Matsuda, Ishikawa (JP); Gota Tosaki, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/239,147

(22) Filed: Aug. 17, 2016

(65) Prior Publication Data

US 2017/0318164 A1    Nov. 2, 2017

(30) Foreign Application Priority Data

Apr. 28, 2016    (JP) .................................. 2016-091504

(51) Int. Cl.
*G06K 15/00*    (2006.01)
*H04N 1/00*    (2006.01)
*G06K 9/62*    (2006.01)

(52) U.S. Cl.
CPC ....... *H04N 1/00074* (2013.01); *G06K 9/6212* (2013.01); *H04N 1/00005* (2013.01); *H04N 1/0009* (2013.01); *H04N 1/00018* (2013.01); *H04N 1/00023* (2013.01); *H04N 1/00037* (2013.01); *H04N 1/00063* (2013.01); *H04N 1/00082* (2013.01)

(58) Field of Classification Search
CPC ........... H04N 1/00074; H04N 1/00005; H04N 1/00018; H04N 1/00023; H04N 1/00037; H04N 1/00063; H04N 1/00082; H04N 1/0009; G06K 9/6212

USPC ......................................................... 358/1.14
See application file for complete search history.

(56) References Cited

U.S. PATENT DOCUMENTS

| 5,850,478 A | 12/1998 | Suzuki et al. |
| 7,768,676 B2 * | 8/2010 | Kimura .................... G06K 9/03 345/604 |
| 8,218,168 B2 * | 7/2012 | Iwata .................. G03G 15/5012 358/1.13 |
| 8,542,404 B2 | 9/2013 | Usui |

(Continued)

FOREIGN PATENT DOCUMENTS

| JP | H07-221969 A | 8/1995 |
| JP | H11-296617 A | 10/1999 |

(Continued)

OTHER PUBLICATIONS

Office Action issued in corresponding Japanese Patent Application No. 2016-091504, dated Apr. 25, 2017.

*Primary Examiner* — Marivelisse Santiago Cordero
*Assistant Examiner* — Neil R McLean
(74) *Attorney, Agent, or Firm* — McDermott Will & Emery LLP

(57) ABSTRACT

According to the present disclosure, an image-processing apparatus acquires scan information of the read images read by the image-reading apparatus, generates temporal change data based on the statistical information and the scan information, determines whether the temporal change data satisfy a threshold, and outputs notice information when the temporal change data are determined as failing to satisfy the threshold.

4 Claims, 13 Drawing Sheets

(56) References Cited

U.S. PATENT DOCUMENTS

| | | | | |
|---|---|---|---|---|
| 2007/0097456 A1* | 5/2007 | Kelly | ............... | H04N 1/00002 358/488 |
| 2008/0198398 A1 | 8/2008 | Sasamae | | |
| 2009/0279113 A1* | 11/2009 | Awata | ............... | H04N 1/00222 358/1.9 |
| 2009/0303506 A1* | 12/2009 | Ikegawa | ............. | H04N 1/6094 358/1.9 |
| 2010/0124362 A1* | 5/2010 | Wu | ................... | G03G 15/0152 382/112 |
| 2010/0141991 A1* | 6/2010 | Yoshida | .............. | H04N 1/3878 358/1.15 |
| 2015/0319332 A1 | 11/2015 | Miyashita et al. | | |

FOREIGN PATENT DOCUMENTS

| | | |
|---|---|---|
| JP | 2007-230027 A | 9/2000 |
| JP | 2000-278506 A | 10/2000 |
| JP | 2005-167375 A | 6/2005 |
| JP | 2007-140703 A | 6/2007 |
| JP | 2009-181594 A | 8/2009 |
| JP | 2011-150586 A | 8/2011 |
| JP | 2011-151570 A | 8/2011 |
| JP | 2011-211642 A | 10/2011 |
| JP | 2014-117922 A | 6/2014 |
| JP | 2015-012575 A | 1/2015 |
| JP | 2015-043534 | 3/2015 |
| JP | 2015-207807 A | 11/2015 |
| JP | 2015-211457 A | 11/2015 |

* cited by examiner

IMAGE-PROCESSING APPARATUS AND IMAGE-PROCESSING METHOD

CROSS-REFERENCE TO RELATED APPLICATION

This application is based upon and claims the benefit of priority from Japanese Patent Application No. 2016-091504, filed on Apr. 28, 2016, the entire contents of which are incorporated herein by reference.

BACKGROUND OF THE DISCLOSURE

1. Field of the Disclosure

The present disclosure relates to an image-processing apparatus, an image-processing method, and a computer program product.

2. Description of the Related Art

Techniques for detecting a scan error have been disclosed.

JP-A-2015-12575 discloses a technique of counting read documents between documents with a specific pattern, thereby easily detecting documents overlapping.

JP-A-2014-117922 discloses a technique of detecting the occurrence rate number of jams for sheet delivery and calculating a cost of a sheet from the occurrence rate number, thereby notifying a substantial difference in a sheet cost among brands.

JP-A-2011-150586 discloses a technique of detecting a paper jam in network equipment and recording a failure information history so as to make the failure occurrence situation distinguishable visually and indicating it in a list format, thereby notifying visually the failure occurrence situation tendency without searching in detail every historical information even at a stage where no determination of a multi occurrence situation state is made.

However, a conventional image-processing apparatus disclosed in JP-A-2015-12575 or the like has a problem that it does not output notice information regarding an alarm or a recommendation to a user by highly accounting the recent situations in the temporal change of scan information.

SUMMARY OF THE DISCLOSURE

It is an object of the present disclosure to at least partially solve the problems in the conventional technology.

An image-processing apparatus according to one aspect of the present disclosure is an image-processing apparatus including a statistical information storage unit that stores temporal statistical information of read images read by an image-reading apparatus, a scan information acquiring unit that acquires scan information of the read images read by the image-reading apparatus, a temporal change data generating unit that generates temporal change data based on the statistical information and the scan information, a threshold determining unit that determines whether the temporal change data satisfy a threshold, and an information outputting unit that outputs notice information when the threshold determining unit determines that the temporal change data fail to satisfy the threshold.

An image-processing method according to another aspect of the present disclosure is an image-processing method including a scan information acquiring step of acquiring scan information of read images read by an image-reading apparatus, a temporal change data generating step of generating temporal change data based on temporal statistical information of the read images read by the image-reading apparatus and the scan information, a threshold determining step of determining whether the temporal change data satisfy a threshold, and an information outputting step of outputting notice information when the temporal change data are determined as failing to satisfy the threshold at the threshold determining step.

A computer program product according to still another aspect of the present disclosure is a computer program product having a non-transitory tangible computer readable medium including programmed instructions for causing, when executed by a computer, the computer to perform an image-processing method including a scan information acquiring step of acquiring scan information of read images read by an image-reading apparatus, a temporal change data generating step of generating temporal change data based on temporal statistical information of the read images read by the image-reading apparatus and the scan information, a threshold determining step of determining whether the temporal change data satisfy a threshold, and an information outputting step of outputting notice information when the temporal change data are determined as failing to satisfy the threshold at the threshold determining step.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

An image-processing apparatus, an image-processing method, and a computer program product according to an embodiment of the present disclosure will be described in detail below with reference to drawings. Note that the present disclosure is not limited to this embodiment.

Configuration of the Present Embodiment

Figure 1:
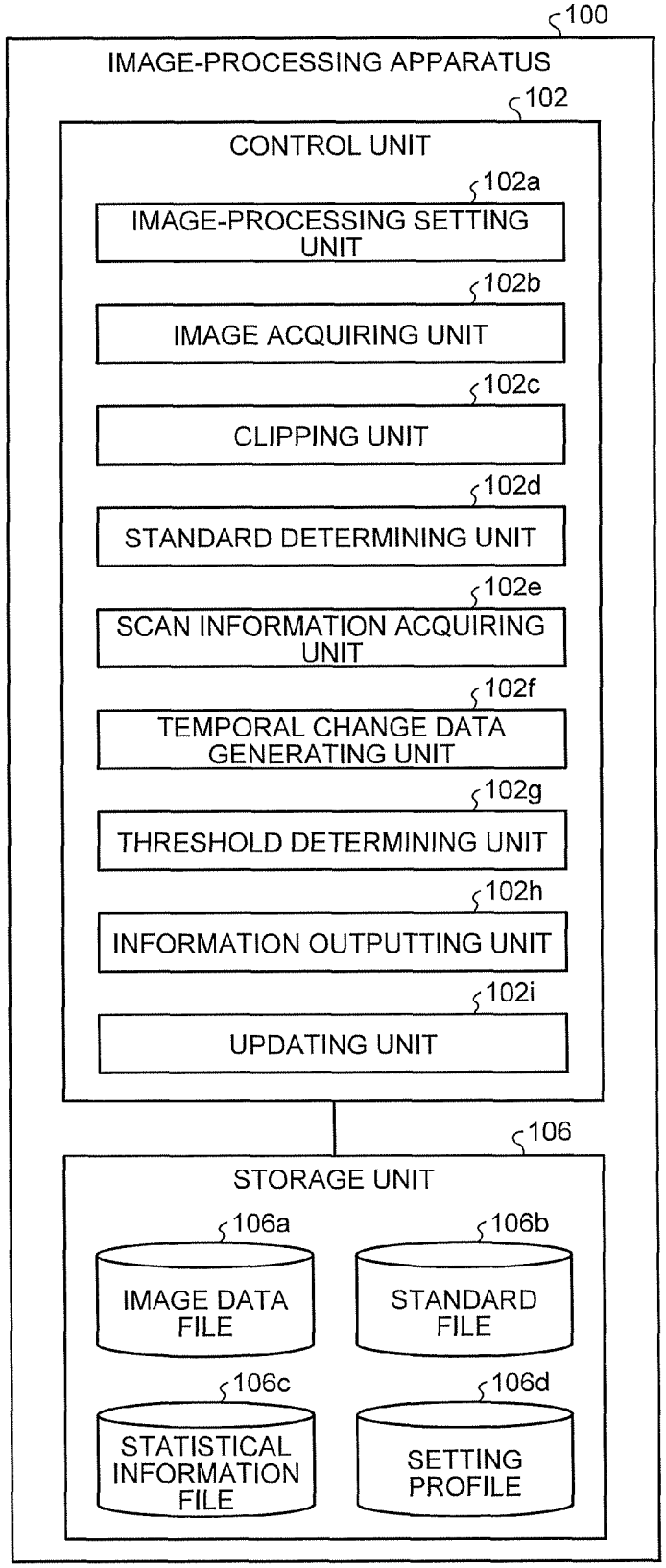
FIG. 1 is a functional block diagram of an example of a configuration of an image-processing apparatus according to an embodiment.

An example of the configuration of an image-processing apparatus 100 according to an embodiment of the present disclosure will be described below with reference to FIGS. 1 and 2, and then, processing etc. according to the embodiment will be described in detail. FIG. 1 is a functional block diagram of the example of the configuration of the image-processing apparatus 100 according to the embodiment.

In the embodiment described below, the image-processing apparatus 100 will be described as an example in order to specify the technical idea of the present disclosure. It is not intended to limit the present disclosure to the image-processing apparatus 100, and the present disclosure is applicable equally to image-processing apparatuses 100 of other embodiments included in the scope of the claims.

Function distribution of the image-processing apparatus 100 described as an example in the embodiment is not limited to the configuration described later. The image-processing apparatus 100 can be configured in such a manner that any units are functionally or physically separated or integrated, as long as similar advantageous effects and functions can be exhibited.

The image-processing apparatus 100 includes, as schematically illustrated in FIG. 1, a control unit 102 and a storage unit 106. These sections of the image-processing apparatus 100 are connected communicatively to each other via an optional communication path.

The image-processing apparatus 100 of the embodiment may be connected to an image-reading apparatus 200 (this section is not shown in FIG. 1). The image-processing apparatus 100 may include the image-reading apparatus 200 in its housing.

The image-reading apparatus 200 may be a document scanner of an automatic document feeding system (ADF system) that is a simplex or duplex scanner, a document scanner of a manual insertion paper feeding system (Continuous Document Feeding (CDF) system), a document scanner of a flatbed type or the like.

The image-processing apparatus 100 may further include an input/output unit 112 (this section is not shown in FIG. 1). The input/output unit 112 performs input/output (I/O) of data.

Further, the input/output unit 112 may be any one, some or all of a key input unit, a touch panel, a control pad (a touch pad, a game pad or the like), a mouse, a keyboard, and a microphone, for example.

Further, the input/output unit 112 may be any one or both of a display unit (a display, a monitor, a touch panel made of liquid crystal or organic EL or the like) configured to display information such as an application, and a sound output unit (a speaker or the like) configured to output sound information as sound.

Further, the image-processing apparatus 100 may further include an interface unit 108 (this section is not shown in FIG. 1). The image-processing apparatus 100 may be connected intercommunicatively to an external apparatus (for example, the image-reading apparatus 200 or the like) via the interface unit 108.

The interface unit 108 may be any one or both of an antenna to be connected to any one or both of a communication line and a telephone line, and an interface (NIC or the like) to be connected to a communication apparatus such as a router. Moreover, it may be a communication interface that performs a communication control between the image-processing apparatus 100 and a network.

The network may include remote communications or the like such as any one or both of wire communications and wireless communications (WiFi or the like). The interface unit 108 may be an input/output interface that performs input/output control between the image-reading apparatus 200 or the like and the control unit 102.

The control unit 102 may control the interface unit 108 and the input/output unit 112.

The storage unit 106 stores any one, some, or all of various kinds of database, tables, and files (image data file 106a, standard file 106b, statistical information file 106c, setting profile 106d and the like). Moreover, the storage unit 106 may store various kinds of application programs (for example, user applications and the like).

The storage unit 106 is a storage unit that may be any one, some, or all of a memory such as a random access memory (RAM) or a read-only memory (ROM), a fixed disc device such as a hard disc, a solid state drive (SSD), a flexible disc, and an optical disc, for example. The storage unit 106 may store computer programs and the like for giving instructions to a central processing unit (CPU) and to perform various processes.

Among these constituent elements of the storage unit 106, the image data file 106a stores image data. The image data may be data read by the image-reading apparatus 200.

Here, the image data may be read image data (input image data), driver output image data (document image data) or output image data and the like. The image data file 106a may store scan information in association with the image data.

The scan information may include any one, some, or all of the number of output sheets, the number of detected blank pages, the number of color output sheets, the number of gray output sheets, the number of binary output sheets, the number of surface sheets, the number of back face sheets, the number of detected multi-feed sheets, the number of sheets for which rotational correction has been executed (0 degree, 90 degrees, 180 degrees, or 270 degrees, for example), the number of sheets where deskew has failed, maximal skew (angle) and the like for each scan.

The standard file 106b stores standard sheet size information and size tolerance information. The standard sheet size information may include information regarding A-series sizes such as A4, B-series sizes such as B5, C-series sizes, American National Standard Institute (ANSI) sizes such as ANSI A, photographs' sizes such as 8×10 in, postcard sizes, envelope sizes and the like.

The statistical information file 106c stores temporal statistical information of images. The statistical information file 106c may store temporal statistical information of read images read by the image-reading apparatus 200. Further, the statistical information file 106c may store temporal change data and the like.

The setting profile 106d stores image-processing setting information set for image processing with respect to image data. The setting profile 106d may store image-processing setting information set for image processing with respect to read image data of read images.

The image-processing setting information may include alarm information for notifying an abnormal state of the image-reading apparatus 200 or the like and a notice information including recommendation notification information for notifying a recommended set value for various kinds of image processing.

Further, the control unit 102 may be constituted of tangible controllers that controls generally the image-processing apparatus 100, including any one, some, or all of CPU, a graphics processing unit (GPU), a digital signal processor (DSP), a large scale integration (LSI), an application specific integrated circuit (ASIC), a field-programming gate array (FPGA) and the like, or a control circuit.

The control unit 102 has an internal memory for storing a control program, a program that regulates various procedures or the like, and required data, and it performs information processing for executing various processes based on these programs.

The control unit 102 includes an image-processing setting unit 102a, an image acquiring unit 102b, a clipping unit 102c, a standard determining unit 102d, a scan information acquiring unit 102e, a temporal change data generating unit 102f, a threshold determining unit 102g, an information outputting unit 102h and an updating unit 102i, as principal constituent elements.

The image-processing setting unit 102a sets image processing with respect to image data. The image-processing setting unit 102a may set image processing with respect to read image data of read images. The image processing may be a process for acquiring scan information of an image.

The image-processing setting unit 102a may set image processing with respect to the image data based on set information inputted via the input/output unit 112.

The image acquiring unit 102b acquires image data. The image acquiring unit 102b may acquire read image data read by the image-reading apparatus 200. Further, the image acquiring unit 102b may store the image data in the image data file 106a.

Further, the image acquiring unit 102b may control image reading (scanning) by the image-reading apparatus 200 so as to acquire image data.

The clipping unit 102c clips document image data of document images. The clipping unit 102c may clip the document image data of the document images by any one or both of deskew processing and crop processing with respect to the image data.

Further, the clipping unit 102c may clip document image data of document images by any one or both of deskew processing and crop processing on the read image data of the read images.

The standard determining unit 102d determines whether a document image corresponds to a standard sheet. The standard determining unit 102d may determine whether the document image corresponds to a standard sheet, based on the standard sheet size information and the size tolerance information stored in the standard file 106b.

The scan information acquiring unit 102e acquires scan information of the image. The scan information acquiring unit 102e may acquire the scan information of the read images read by the image-reading apparatus 200.

Further, when the standard determining unit 102d determines that the document image corresponds to a standard sheet, the scan information acquiring unit 102e acquires scan information of the read images read by the image-reading apparatus 200.

Further, the scan information acquiring unit 102e may calculate an aspect ratio of the document image included in the read images read by the image-reading apparatus 200 so as to acquire scan information including vertical-horizontal length information.

Further, the scan information acquiring unit 102e may detect vertical streaks in the document image included in the read images read by the image-reading apparatus 200 so as to acquire scan information including the number of vertical streaks.

Further, the scan information acquiring unit 102e may detect a document image of a blank page included in the read images read by the image-reading apparatus 200 so as to acquire scan information including the number of detected blank page documents.

Further, the scan information acquiring unit 102e may acquire erect direction information of the document image included in the read images read by the image-reading apparatus 200. Further, the scan information acquiring unit 102e may acquire color information of the document image included in the read images read by the image-reading apparatus 200.

Further, the scan information acquiring unit 102e may detect a document image of a document that has a ground pattern and that is included in the read images read by the image-reading apparatus 200 so as to acquire scan information including the number of detected documents each having a ground pattern.

Further, the scan information acquiring unit 102e may detect a document image of a tabbed document included in the read images read by the image-reading apparatus 200 so as to acquire scan information including the number of detected tabbed documents.

Further, the scan information acquiring unit 102e may detect a document image of a punched document included in the read images read by the image-reading apparatus 200 so as to acquire scan information including the number of detected punched documents.

Further, the scan information acquiring unit 102e may detect a document image of a creased (folded) or broken (torn) document included in the read images read by the image-reading apparatus 200 so as to acquire scan information including the number of detected creased or broken documents.

Further, the scan information acquiring unit 102e may detect a document image of a halftone print included in the read images read by the image-reading apparatus 200 so as to acquire scan information including the number of detected halftone prints.

Further, the scan information acquiring unit 102e may store scan information in the image data file 106a.

The temporal change data generating unit 102f generates temporal change data of an image. The temporal change data generating unit 102f may generate temporal change data of the read images, based on the statistical information stored in the statistical information file 106c and the scan information of the read images.

Further, the temporal change data generating unit 102f may generate temporal change data of a time to an aspect ratio for each standard sheet based on the statistical information stored in the statistical information file 106c and an aspect ratio calculated by the scan information acquiring unit 102e.

Further, the temporal change data generating unit 102f may generate temporal change data of a time to a vertical streak number detection rate based on the statistical information stored in the statistical information file 106c and the number of vertical streaks detected by the scan information acquiring unit 102e.

Further, the temporal change data generating unit 102f may generate temporal change data of a time to a blank page detection rate based on the statistical information stored in the statistical information file 106c and the number of blank page documents detected by the scan information acquiring unit 102e.

Further, the temporal change data generating unit 102f may generate temporal change data of a time to a non-correction rate for the erect correction based on the statistical information stored in the statistical information file 106c and erect direction information acquired by the scan information acquiring unit 102e.

The non-correction rate for the erect correction may indicate a percentage that the rotational angle of the image for correction becomes 0 degree (namely, erect correction is decided as unnecessary) as a result of an erect determination.

Further, the temporal change data generating unit 102f may generate temporal change data of a time to a color output rate, a gray output rate and a binary output rate, based on the statistical information stored in the statistical information file 106c and color information acquired by the scan information acquiring unit 102e.

Further, the temporal change data generating unit 102f may generate temporal change data of a time to a ground pattern detection rate based on the statistical information stored in the statistical information file 106c and the number of documents that have ground patterns and that are detected by the scan information acquiring unit 102e.

Further, the temporal change data generating unit 102f may generate temporal change data of a time to a tab detection rate based on the statistical information stored in the statistical information file 106c and the number of tabbed documents detected by the scan information acquiring unit 102e.

Further, the temporal change data generating unit 102f may generate temporal change data of a time to a punch hole detection rate based on the statistical information stored in the statistical information file 106c and the number of punched documents detected by the scan information acquiring unit 102e.

Further, the temporal change data generating unit 102f may generate temporal change data of a time to a document crease-break occurrence rate based on the statistical information stored in the statistical information file 106c and the number of creased or broken documents detected by the scan information acquiring unit 102e.

Further, the temporal change data generating unit 102f may generate temporal change data of a time to a halftone print detection rate based on the statistical information stored in the statistical information file 106c and the number of halftone prints detected by the scan information acquiring unit 102e.

Further, the temporal change data generating unit 102f may store the temporal change data in the statistical information file 106c.

The threshold determining unit 102g determines whether the temporal change data satisfy a threshold.

The information outputting unit 102h outputs notice information. When the threshold determining unit 102g determines that the temporal change data fail to satisfy the threshold, the information outputting unit 102h may output notice information.

The notice information may be alarm information for notifying an abnormal state of the image-reading apparatus 200. Further, the notice information may be recommendation notification information for notifying a recommended set value for image processing.

Further, when the threshold determining unit 102g determines that the temporal change data fail to satisfy the threshold, the information outputting unit 102h may output alarm information for notifying an abnormal state in a roller of the image-reading apparatus 200.

Further, when the threshold determining unit 102g determines that the temporal change data fail to satisfy the threshold, the information outputting unit 102h may output alarm information for notifying an abnormal state in a glass surface of the image-reading apparatus 200.

Further, when the threshold determining unit 102g determines that the temporal change data fail to satisfy the threshold, the information outputting unit 102h may output recommendation notification information for notifying a recommended set value of a blank page removal function included in the image processing.

Further, when the threshold determining unit 102g determines that the temporal change data fail to satisfy the threshold, the information outputting unit 102h may output recommendation notification information for notifying a recommended set value of an erect correction function included in the image processing.

Further, when the threshold determining unit 102g determines that the temporal change data fail to satisfy the threshold, the information outputting unit 102h may output recommendation notification information for notifying a recommended set value of an automatic color determination function included in the image processing.

Further, when the threshold determining unit 102g determines that the temporal change data fail to satisfy the threshold, the information outputting unit 102h may output recommendation notification information for notifying a recommended set value of a ground pattern removal function included in the image processing.

Further, when the threshold determining unit 102g determines that the temporal change data fail to satisfy the threshold, the information outputting unit 102h may output recommendation notification information for notifying a recommended set value for deciding whether to perform a blank page detection including a tab included in the image processing.

Further, when the threshold determining unit 102g determines that the temporal change data fail to satisfy the threshold, the information outputting unit 102h may output recommendation notification information for notifying a recommended set value for deciding whether to perform document image clipping including a tab.

Further, when the threshold determining unit 102g determines that the temporal change data fail to satisfy the threshold, the information outputting unit 102h may output recommendation notification information for notifying a recommended set value of a punch hole removal function included in the image processing.

Further, when the threshold determining unit 102g determines that the temporal change data fail to satisfy the threshold, the information outputting unit 102h may output recommendation notification information for notifying a recommended set value of a document crease-break correction processing function included in the image processing.

Further, when the threshold determining unit 102g determines that the temporal change data fail to satisfy the threshold, the information outputting unit 102h may output recommendation notification information for notifying a recommended set value of a moire fringe reduction function included in the image processing.

Further, the information outputting unit 102h may output image data. The information outputting unit 102h may output any one or both of the notice information and the image data via the input/output unit 112.

The updating unit 102i stores the scan information in the statistical information file 106c so as to update the statistical information.

Furthermore, an example of hardware configuration of the image-processing apparatus 100 according to the embodiment will be explained with reference to FIG. 2. FIG. 2 is a block diagram of an example of a hardware configuration of the image-processing apparatus 100 according to the embodiment.

Figure 2:
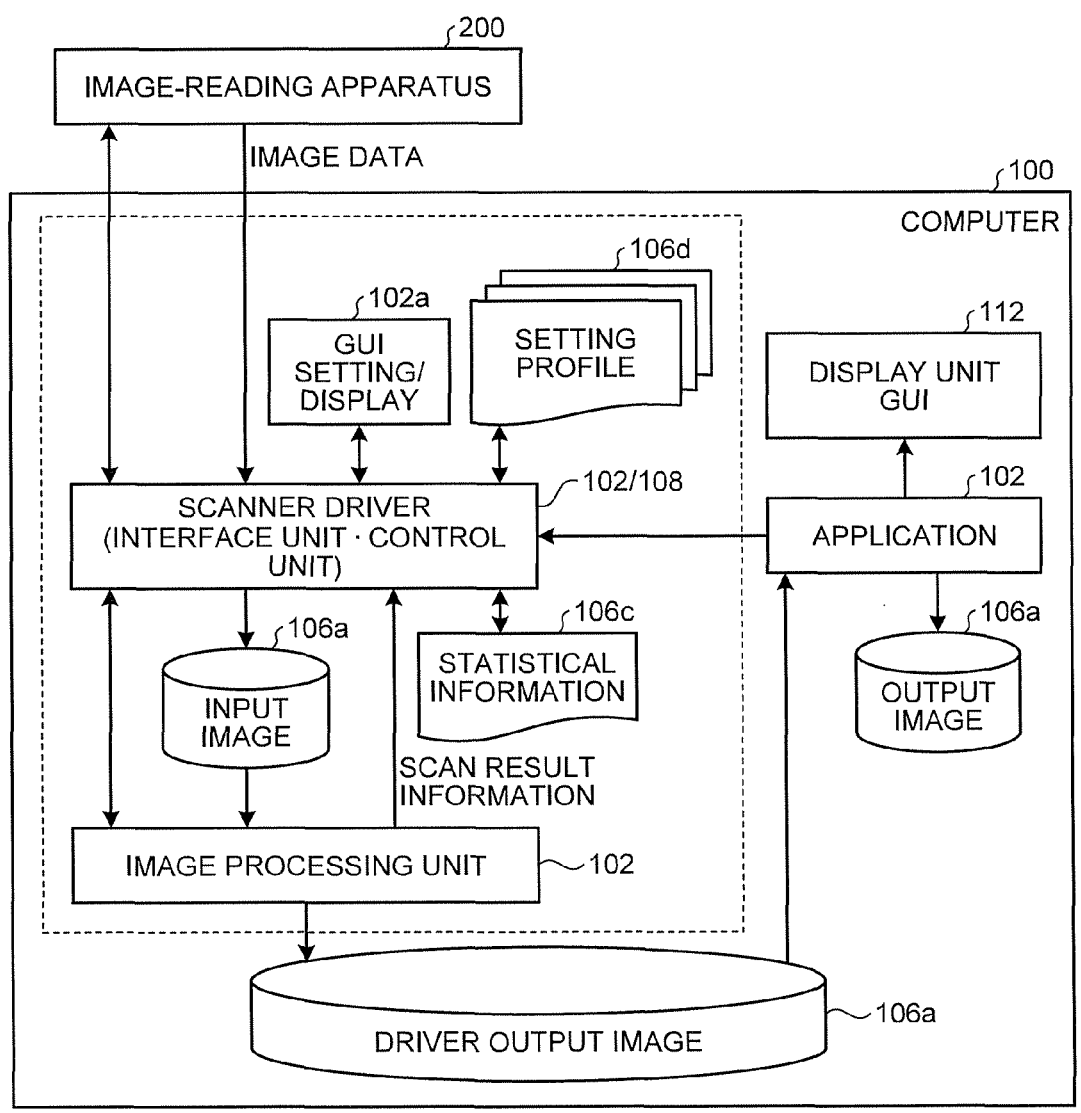
FIG. 2 is a block diagram of an example of a hardware configuration of an image-processing apparatus according to the embodiment.

As illustrated in FIG. 2, the image-processing apparatus (computer) 100 may be connected communicatively to the image-reading apparatus 200 via the interface unit 108 that constitutes a scanner driver.

As illustrated in FIG. 2, the image-processing apparatus 100 may include a control unit 102 including the image acquiring unit 102b constituting a scanner driver that acquires image data read by the image-reading apparatus 200 and that stores the data in the image data file (input image data file) 106a.

The control unit 102 constituting the scanner driver may include an image-processing setting unit 102a that causes the input/output unit 112 to display a graphical user interface (GUI) for setting image processing with respect to the image data. When a user inputs setting information via the input/output unit 112, the image-processing setting unit 102a sets image processing and refers to image-processing setting information stored in the setting profile 106d.

Further, the control unit 102 constituting the scanner driver may include an updating unit 102i that stores scan information (scan result information) in the statistical information file 106c so as to update the statistical information.

Further, the control unit (image process unit) 102 may include a clipping unit 102c, a standard determining unit 102d, a scan information acquiring unit 102e, a temporal change data generating unit 102f and a threshold determining unit 102g, and execute various kinds of image processing with respect to image data acquired from the input image data file 106a.

The image process unit 102 may store the document image data in the image data file (driver output image data file) 106a. Further, the image process unit 102 may acquire scan information, temporal change data and the like.

Further, the control unit (application) 102 may include an information outputting unit 102h that causes the input/output unit (display unit) 112 to display any one or both of notice information and image data. The application 102 may cause the display unit 112 to display document image data and the like acquired from the driver output image data file 106a.

Further, the application 102 (image-processing setting unit 102a) may cause the display unit 112 to display GUI to accept an execution instruction of image processing (for example, image processing regulated in the recommendation notification information) with respect to the displayed image data.

Further, when the user inputs an execution instruction of image processing via the input/output unit 112, the application 102 may execute the image processing (for example, punch hole removal) with respect to the image data and stores the data in the image data file (output image data file) 106a.

Processing of the Embodiment

An example of processing executed in the image-processing apparatus 100 having the above-described configuration will be explained with reference to FIG. 3 to FIG. 17.

Device Healthcare Notification Processing (Roller Exchange Alarm Notification Processing)

Figure 3:
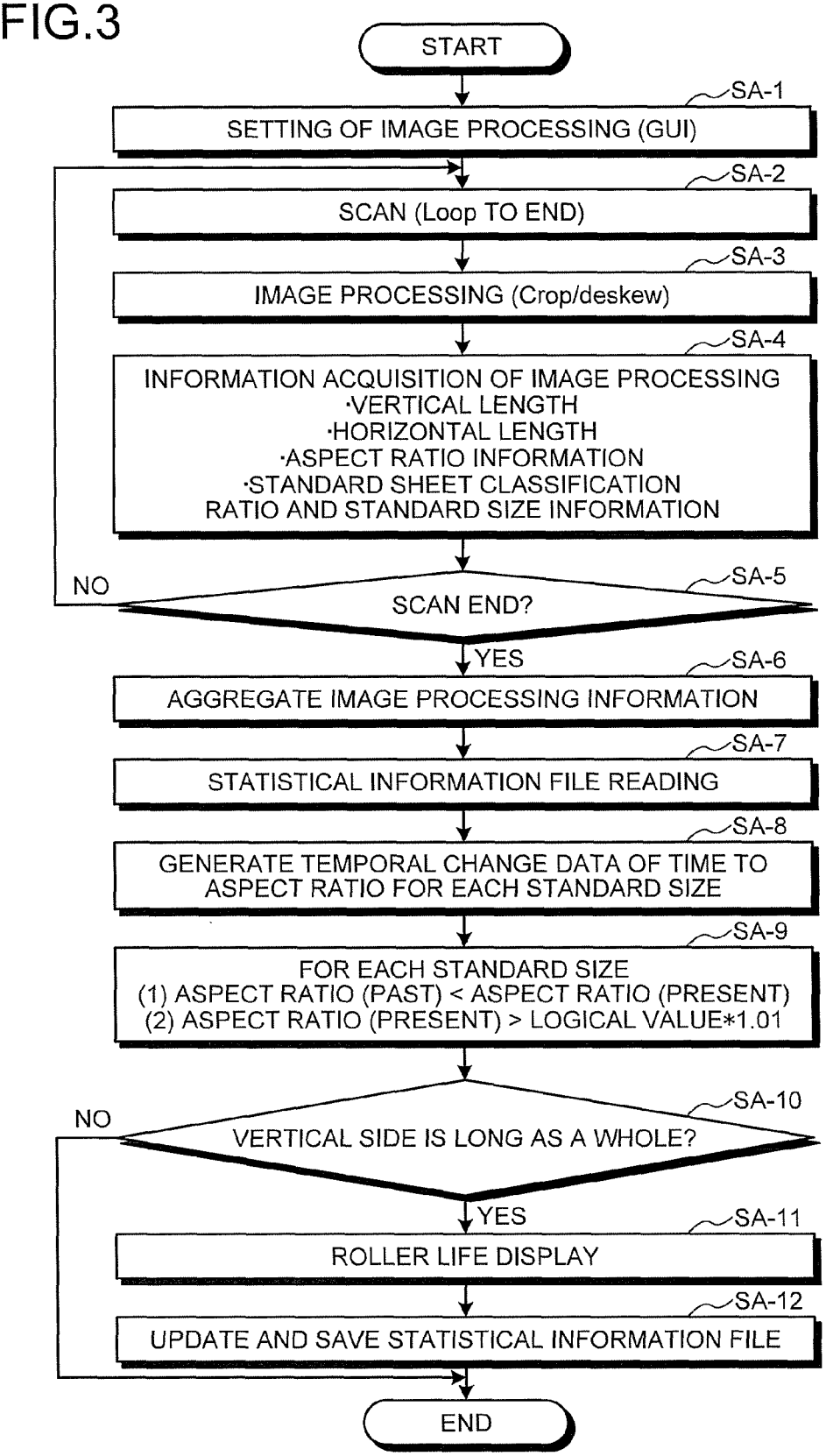
FIG. 3 is a flow chart of an example of processing in an image-processing apparatus of the embodiment.

First, an example of device healthcare notification processing in the embodiment will be explained with reference to FIGS. 3 to 8. FIG. 3 is a flow chart of an example of processing in the image-processing apparatus 100 of the embodiment.

As illustrated in FIG. 3, first, the image-processing setting unit 102a causes the input/output unit 112 to display GUI for setting image processing with respect to the read image data. When a user inputs setting information for a roller exchange alarm notification via the input/output unit 112, the image-processing setting unit 102a sets deskew processing and crop processing (Step SA-1).

In this manner, the image processing may be defined as deskew processing and crop processing. In the embodiment, the processing may be performed for collecting information even when the roller exchange alarm notification function is set to off.

Then, the image acquiring unit 102b controls a scan with respect to a plurality (a large amount) of documents by the image-reading apparatus 200 so as to acquire read image data read by the image-reading apparatus 200, and stores the read image data in the image data file 106a (Step SA-2).

Then, the clipping unit 102c clips document image data of the document image by image processing (deskew processing and crop processing) on the document image data (Step SA-3).

Figure 4:
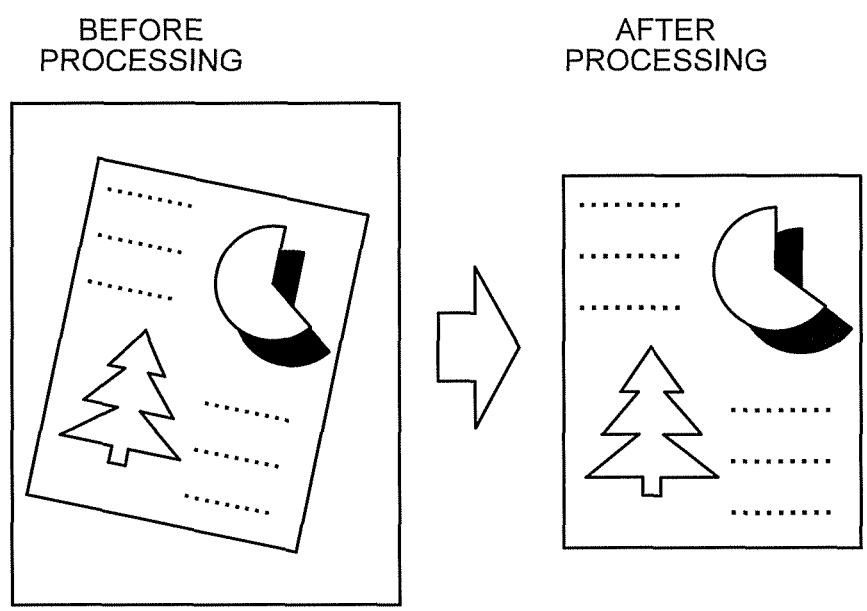
FIG. 4 is a diagram of an example of deskew-crop processing of the embodiment.

Here, an example of the deskew-crop processing of the embodiment will be explained with reference to FIG. 4. FIG. 4 is a diagram of an example of deskew-crop processing of the embodiment.

As illustrated in FIG. 4, in the embodiment, it is possible to extract four sides of a document in a background image (black) of the image-reading apparatus 200 and to execute a process of clipping a document part from a scanner image.

Returning to FIG. 3, the scan information acquiring unit 102e acquires scan information (namely, a vertical length of document image, a horizontal length of document image, vertical-horizontal length information of document image, and standard sheet classification of document image) of read images including a document image determined by the standard determining unit 102d as corresponding to a standard sheet, based on the standard sheet size information and the size tolerance information stored in the standard file 106b, and stores the scan information in the image data file 106a in association with the read image data (Step SA-4).

Namely, in the embodiment, it is possible to focus on the fact that the standard size have been normalized (the aspect ratio has been known) and to calculate the aspect ratio of the document image determined as corresponding to each standard size.

Figure 5:
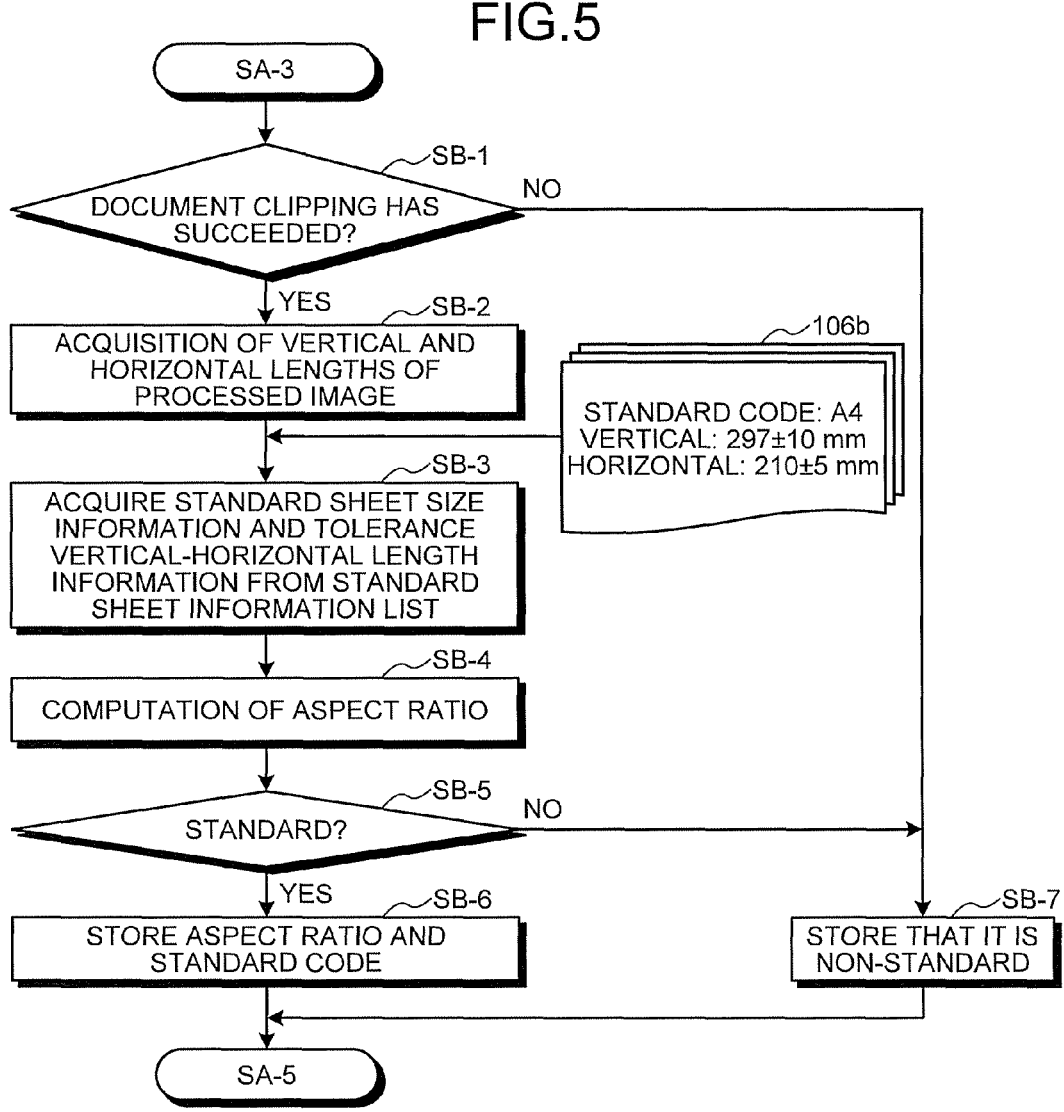
FIG. 5 is a flow chart of an example of processing in an image-processing apparatus of the embodiment.

Here, an example of details of the processing for scan information acquisition at Step SA-4 in FIG. 3 will be explained with reference to FIG. 5. FIG. 5 is a flow chart of an example of processing in the image-processing apparatus 100 of the embodiment.

As illustrated in FIG. 5, the control unit 102 determines whether the clipping of the document image data of the document from the read image data by the deskew-crop processing with the clipping unit 102c has succeeded (Step SB-1).

Then, when the control unit 102 determines that the clipping of the document image data of the document from the read image data has not succeeded (Step SB-1: No), the processing is shifted to Step SB-7.

On the other hand, when the control unit 102 determines that the clipping of the document image data of the document from the read image data has succeeded (Step SB-1: Yes), the processing is shifted to Step SB-2.

Then, the standard determining unit 102d acquires the vertical and horizontal lengths of the document image (processed image) of the document image data clipped by the deskew-crop processing (Step SB-2).

Then, the standard determining unit 102d acquires the standard sheet size information and the size tolerance information (tolerance vertical-horizontal length information) stored in the standard file (standard sheet information list) 106b (Step SB-3).

In this manner, the standard sheet size information such as "A4" and "postcard" and the size tolerance information to be preset are stored in the standard sheet information list 106b.

For the purpose of roller wear detection, a large tolerance may be set with respect to the scanner feed (vertical) direction for the size tolerance.

Then, the scan information acquiring unit 102e computes the aspect ratio of the document image (Step SB-4).

In this manner, in the embodiment, when the deskew-crop processing has succeeded, it is possible to perform information collection and store the vertical length and the horizontal length in unit of millimeter or the like while the image is not updated.

The vertical length may be estimated from the crop processing result so that it corresponds to the scanner feed direction. In the embodiment, when the skew angle of the document image is equal or larger than a certain level, the document image may be decided as being inapplicable to decision of feed slip degree and may be excluded.

Then, the standard determining unit 102d determines, based on the standard sheet size information and the tolerance vertical-horizontal length information, whether the document image corresponds to a standard sheet (Step SB-5).

Then, when the standard determining unit 102d determines that the document image corresponds to a standard sheet (Step SB-5: Yes), the processing is shifted to Step SB-6.

Then, the scan information acquiring unit 102e stores (memorizes) the vertical-horizontal length information of the document image and scan information including standard codes in the image data file 106a in association with the read image data (Step SB-6), and the processing is shifted to Step SA-5.

On the other hand, when the standard determining unit 102d determines that the document image does not correspond to the standard sheet (Step SB-5: No), the processing is shifted to Step SB-7.

Then, the scan information acquiring unit 102e stores (memorizes) the scan information that the document image is non-standard in the image data file 106a in association with the read image data (Step SB-7), and the processing is shifted to Step SA-5.

In the embodiment, a sheet that is not a standard and an aspect ratio at the time of failure in crop processing may be excluded since they cannot be utilized for "roller wear determination".

Returning to FIG. 3, the image acquiring unit 102b determines whether the scan by the image-reading apparatus 200 has ended (Step SA-5).

Then, when the image acquiring unit 102b determines that the scan by the image-reading apparatus 200 has not ended (Step SA-5: No), the processing is shifted to Step SA-2.

On the other hand, when the image acquiring unit 102b determines that the scan by the image-reading apparatus 200 has ended (Step SA-5: Yes), the processing is shifted to Step SA-6.

Then, the scan information acquiring unit 102e aggregates scan information (image processing information) of read images from the image data file 106a (step SA-6).

Then, the temporal change data generating unit 102f reads temporal statistical information of read images from the statistical information file 106c (Step SA-7).

Then, the temporal change data generating unit 102f generates temporal change data of a time to an aspect ratio for each standard sheet (standard size) based on the statistical information and vertical-horizontal length information included in image processing information (Step SA-8).

Then, the threshold determining unit 102g acquires a determination result of whether the following (1): aspect ratio (past)<aspect ratio (present) and (2): aspect ratio (present)>logical value*1.01 are satisfied, based on the temporal change data and a predetermined threshold (logical value*1.01) for each standard size (Step SA-9).

The threshold may be a value within ±1% of magnification coverage of the image-reading apparatus 200.

Figure 6:
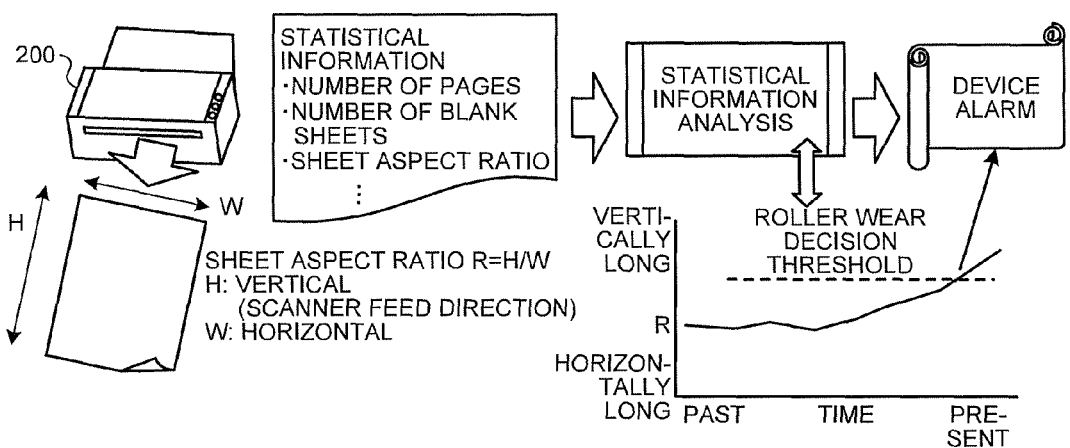
FIG. 6 is a diagram of an example of device healthcare notification processing in the embodiment.

Here, an example of temporal change data and the threshold in the embodiment will be explained with reference to FIG. 6. FIG. 6 is a diagram of an example of device healthcare notification processing in the embodiment.

As illustrated in FIG. 6, in the embodiment, the temporal change data may be data where a temporal change in an aspect ratio of a document image from the past to the present is plotted, and the threshold may be a value of the roller wear decision threshold.

Returning to FIG. 3, the threshold determining unit 102g determines, based on the determination result, whether the vertical side of the document image is long as a whole (Step SA-10). If the scanner roller is worn or degraded, the document image will be elongated in the scanner feed direction (vertical direction).

Then, when the threshold determining unit 102g determines that the vertical side of the document image is not long as a whole (Step S10: No), the processing is shifted to Step SA-12.

On the other hand, when the threshold determining unit 102g determines that the vertical side of the document image is long as a whole (Step S10: Yes), the processing is shifted to Step SA-11.

Then, the information outputting unit 102h causes the input/output unit 112 to display alarm information (roller wear alarm information) regarding a roller life for notifying an abnormal state in the roller of the image-reading apparatus 200 (Step SA-11).

Figure 7:
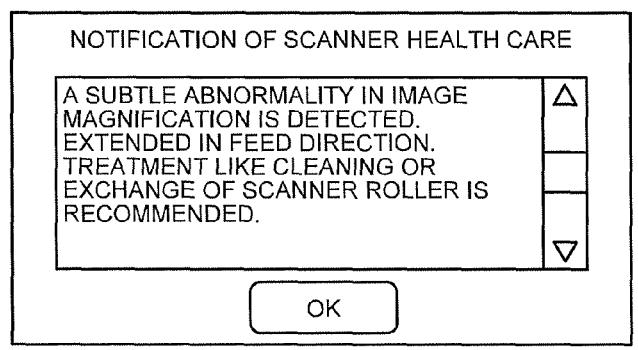
FIG. 7 is a diagram of an example of alarm information of the embodiment.

Here, an example of the alarm information of the embodiment will be explained with reference to FIG. 7. FIG. 7 is a diagram of an example of alarm information of the embodiment.

As illustrated in FIG. 7, in the embodiment, roller wear alarm information to recommend cleaning or exchange of the roller of the image-reading apparatus 200 may be displayed in a text format.

Returning to FIG. 3, the updating unit 102i updates and saves the statistical information stored in the statistical information file 106c by use of the scan information (Step SA-12), and then the processing is ended.

Figure 8:
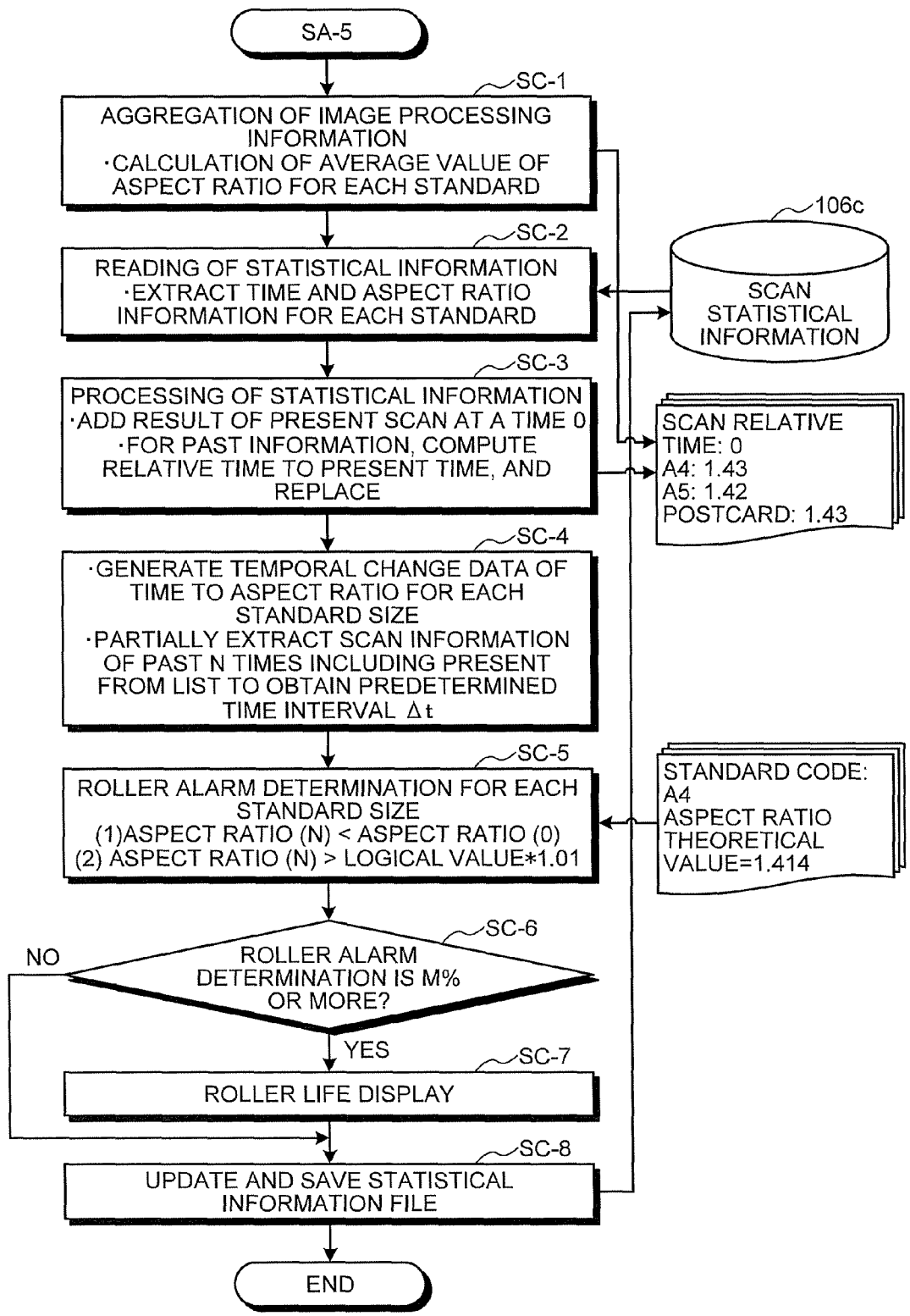
FIG. 8 is a flow chart of an example of processing in an image-processing apparatus of the embodiment.

Here, an example of the details of scan information acquisition processing from Step SA-6 to Step SA-12 in FIG. 3 will be explained with reference to FIG. 8. FIG. 8 is a flow chart of an example of processing in the image-processing apparatus 100 of the embodiment.

As illustrated in FIG. 8, the scan information acquiring unit 102e calculates an average value of aspect ratio for each standard size as an aggregation of scan information (image processing information) of read images from the image data file 106a (Step SC-1).

Then, the temporal change data generating unit 102f extracts a time to vertical-horizontal length information for each standard size as reading of temporal statistical information of read images from the statistical information file (scan statistical information file) 106c (Step SC-2).

Then, the temporal change data generating unit 102f adds the result of the present scan at a time 0 as processing of statistical information. For the past information, a time in relation to the present time is calculated and replaced (Step SC-3).

Then, the temporal change data generating unit 102f generates temporal change data of a time to an aspect ratio for each standard size, and partially extracts scan information of the past N-times including the present from the list of the temporal change data so as to obtain a predetermined time interval Δt (Step SC-4).

Then, the threshold determining unit 102g acquires, as a roller alarm determination for each standard size (standard code), a determination result of whether (1): aspect ratio (N)<aspect ratio (0) and (2): aspect ratio (0)>logical value*1.01 are satisfied, based on the temporal change data and a predetermined threshold (aspect ratio logical value*1.01) (Step SC-5).

Returning to FIG. 3, the threshold determining unit 102g determines, based on the determination result, whether the scan information satisfying the (1) and (2) of the roller alarm determination is equal to or more than M % (Step SC-6).

Then, when the threshold determining unit 102g determines that the scan information is less than M % (Step SC-6: No), the processing is shifted to Step SC-8.

On the other hand, when the threshold determining unit 102g determines that the scan information is equal to or more than M % (Step SC-6: Yes), the processing is shifted to Step SC-7.

Then, the information outputting unit 102h displays the alarm information regarding the roller life via the input/output unit 112 for notifying an abnormal state in the roller of the image-reading apparatus 200 (Step SC-7).

Then, the updating unit 102i updates and saves the statistical information stored in the statistical information file 106c by use of present scan information (Step SC-8), and the processing is ended.

Here, an example of device healthcare notification processing of the embodiment will be explained with reference to FIG. 6.

As illustrated in FIG. 6, in the embodiment, the scan information (for example, vertical (scan feed direction: H) length, horizontal (w) length, and sheet aspect ratio (R=H/W)) of a document image read by the image-reading apparatus 200 is acquired.

Then, in the embodiment, it is possible to compare the scan information and the saved past scan information (statistical information like any one, some or all of the number of pages, the number of blank pages, and sheet aspect ratio) so as to perform a statistical information analysis, thereby calculating changes for each information.

Then, in the embodiment, an inherent threshold (for example, a roller wear decision threshold) with respect to this change (for example, the sheet aspect ratio) may be set to determine any abnormality in the state of the image-reading apparatus 200 when the change is greater than the threshold.

Then, in the embodiment, when this abnormality in state is detected, a device alarm for notifying an operator of the abnormality may be displayed.

Device Healthcare Notification Processing (Clean Alarm Notification Processing)

Figure 9:
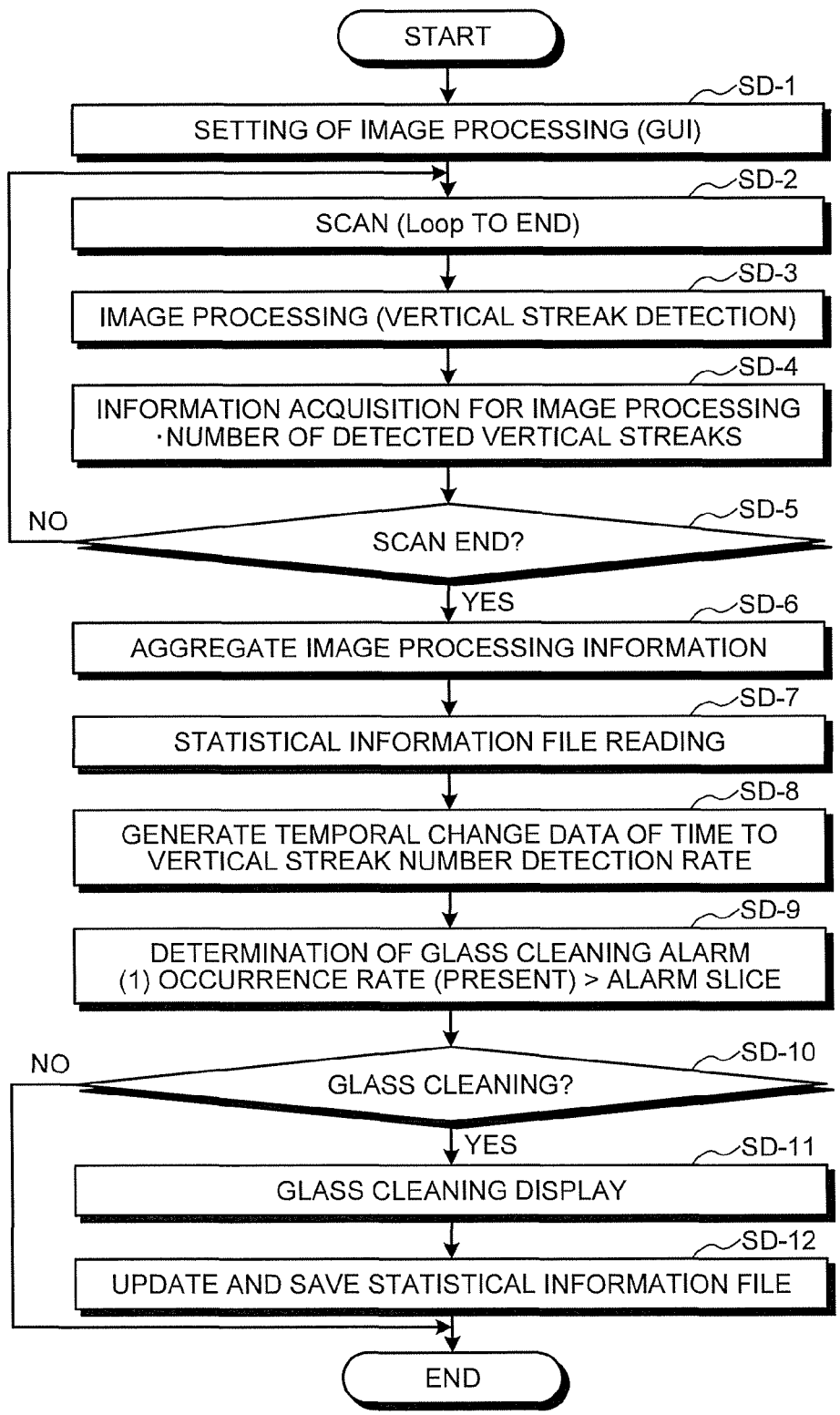
FIG. 9 is a flow chart of an example of processing in an image-processing apparatus of the embodiment.
Figure 10:
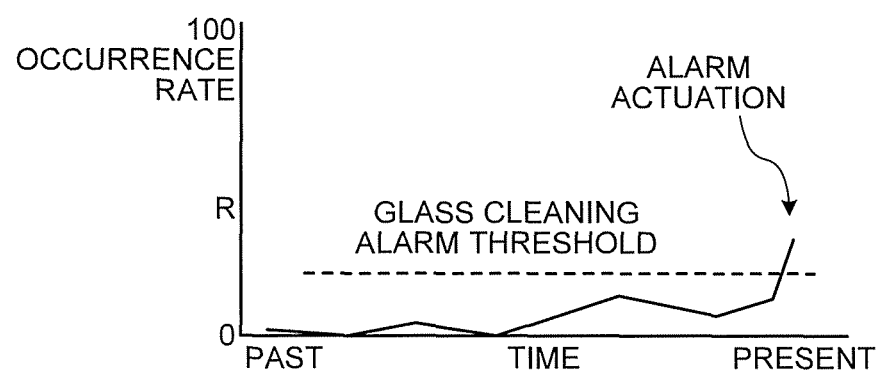
FIG. 10 is a diagram of an example of temporal change data and a threshold in the embodiment.
Figure 11:
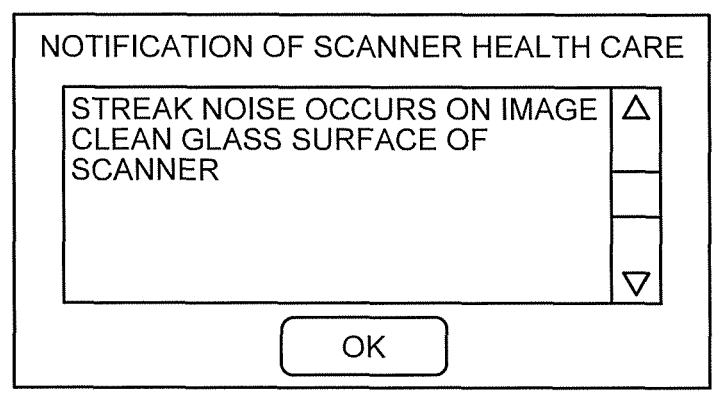
FIG. 11 is a diagram of an example of alarm information of the embodiment.

With reference to FIG. 9 to FIG. 11, an example of device healthcare notification processing in the embodiment will be explained. FIG. 9 is a flow chart of an example of processing in the image-processing apparatus 100 of the embodiment.

As illustrated in FIG. 9, first, the image-processing setting unit 102a causes the input/output unit 112 to display GUI for setting image processing with respect to the read image data, and when a user inputs setting information for cleaning alarm notification via the input/output unit 112, the image-processing setting unit 102a sets vertical streak detection processing (Step SD-1).

Then, the image acquiring unit 102b controls scan with respect to a plurality (a large amount) of documents by the image-reading apparatus 200 so as to acquire read image data read by the image-reading apparatus 200, and stores the read image data in the image data file 106a (Step SD-2).

Then, the scan information acquiring unit 102e performs image processing (vertical streak detection processing) with respect to the read image data so as to detect vertical streaks in the document image included in the read images read by the image-reading apparatus 200 (Step SD-3).

Then, the scan information acquiring unit 102e acquires scan information including the number of detected vertical streaks, and stores the scan information in the image data file 106a in association with the read image data (Step SD-4).

Then, the image acquiring unit 102b determines whether the scan by the image-reading apparatus 200 has ended (Step SD-5).

Then, when the image acquiring unit 102b determines that the scan by the image-reading apparatus 200 has not ended (Step SD-5: No), the processing is shifted to Step SD-2.

On the other hand, when the image acquiring unit 102b determines that the scan by the image-reading apparatus 200 has ended (Step SD-5: Yes), the processing is shifted to Step SD-6.

Then, the scan information acquiring unit 102e aggregates scan information (image processing information) of the read images from the image data file 106a (Step SD-6).

Then, the temporal change data generating unit 102f reads temporal statistical information of the read images from the statistical information file 106c (Step SD-7).

Then, the temporal change data generating unit 102f generates temporal change data of a time to the vertical streak number detection rate (vertical streak occurrence rate)

based on the statistical information and the number of vertical streaks included in the image processing information (Step SD-8).

For smoothing with read images for 100 sheets, the vertical streak number detection rate (t) may be [Σ(t−99 to t)N(t)]/100 (here, N(t)=(the number of detected streaks at scan serial number t)).

Then, the threshold determining unit 102g acquires a determination result of whether (1): vertical streak occurrence rate (present)>alarm threshold is satisfied, based on the temporal change data and a predetermined threshold (alarm threshold), as a determination of glass cleaning alarm (Step SD-9).

The vertical streak occurrence rate (R) may be (the number of images where vertical streaks are detected/total number of output images)*100. Further, the vertical streak occurrence rate (R) may be (the number of detected vertical streaks/total number of output images)*100 (in this case, since R may exceed 100%, the threshold is preset appropriately).

In the embodiment, for determining a condition where glass cleaning is not performed frequently or glass cleaning is performed frequently, a determination result of whether the following (2) or (3) is satisfied may be acquired, when (2): cleaning alarm notification setting is off, and the vertical streak occurrence rate (R) is more than 10% for 3 months or more; and (3): cleaning alarm notification setting is on, and the vertical streak occurrence rate (R) is less than 1% for 3 months or more.

Here, an example of the temporal change data and the threshold in the embodiment will be explained with reference to FIG. 10. FIG. 10 is a diagram of an example of temporal change data and a threshold in the embodiment.

As illustrated in FIG. 10, in the embodiment, the temporal change data may be data where the temporal change in the vertical streak number detection rate in either the read images or the document images from the past to the present is plotted, and the threshold may be a value of a glass cleaning alarm threshold.

Returning to FIG. 9, the threshold determining unit 102g determines, based on the determination result, whether the glass unit of the image-reading apparatus 200 need glass cleaning (Step SD-10).

When the threshold determining unit 102g determines that the glass cleaning is not necessary (Step SD-10: No), the processing is shifted to Step SD-12.

On the other hand, when the threshold determining unit 102g determines that the glass cleaning is necessary (Step SD-10: Yes), the processing is shifted to Step SD-11.

Then, the information outputting unit 102h causes the input/output unit 112 to display alarm information regarding glass cleaning (glass cleaning alarm information) for notifying an abnormal state in the glass part of the image-reading apparatus 200 (Step SD-11).

Here, an example of the alarm information in the embodiment will be explained with reference to FIG. 11. FIG. 11 is a diagram of an example of alarm information in the embodiment.

As illustrated in FIG. 11, in the embodiment, the glass cleaning alarm information to issue an alarm to clean the glass unit of the image-reading apparatus 200 may be displayed in a text format. In this way, in the embodiment, an instruction of cleaning may be issued if the vertical streak occurrence rate is high.

Returning to FIG. 9, the updating unit 102i updates and saves the statistical information stored in the statistical information file 106c by use of scan information (Step SD-12), and the processing is ended.

In the embodiment, the temporal change of the vertical streak occurrence rate is observed. This allows use of a low-pass filter (LPF) to avoid any accidents, thereby achieving reliability and stability in alarm display.

In this manner, in the embodiment, the timing for cleaning or exchange can be notified with reference to abnormality in the output image, and thus, it is useful for maintenance of the image-reading apparatus 200.

Recommended Image Processing Profile Notification Processing (Punch Hole Removal Function Notification Processing)

Figure 12:
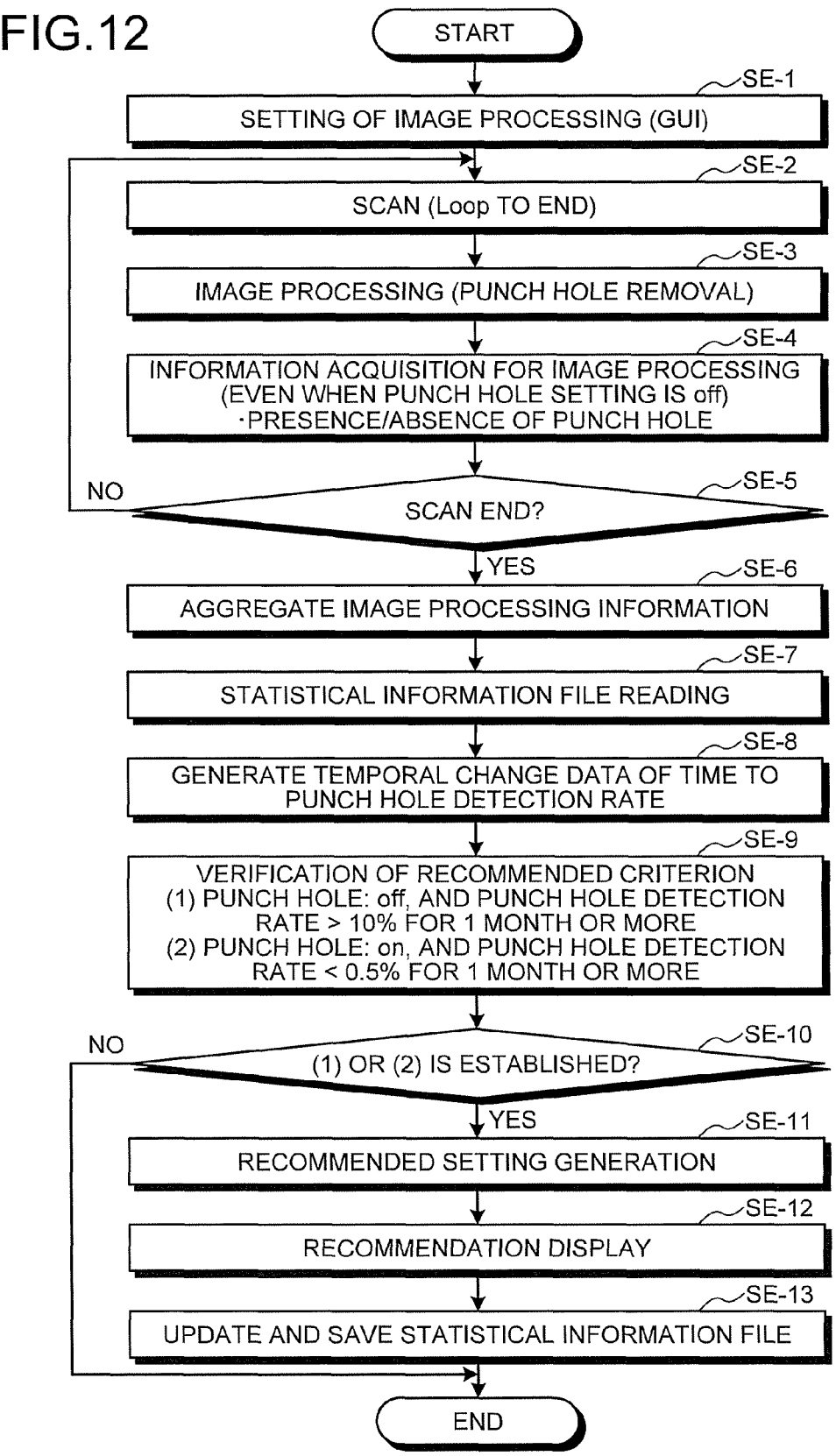
FIG. 12 is a flow chart of an example of processing in an image-processing apparatus of the embodiment.

An example of recommended image processing profile notification processing in the embodiment will be explained with reference to FIG. 12 to FIG. 14. FIG. 12 is a flow chart of an example of processing in the image-processing apparatus 100 of the embodiment.

As illustrated in FIG. 12, first, the image-processing setting unit 102a causes the input/output unit 112 to display GUI for setting image processing with respect to read image data, and, when a user inputs setting information for punch hole removal function via the input/output unit 112, the image-processing setting unit 102a sets on/off of the punch hole detection processing (Step SE-1).

Then, the image acquiring unit 102b controls scan with respect to a plurality (a large amount) of documents by the image-reading apparatus 200, acquires read image data read by the image-reading apparatus 200, and stores the read image data in the image data file 106a (Step SE-2).

Then, even if the user does not set the punch hole removal function (namely, the setting is off), the scan information acquiring unit 102e performs image processing (punch hole detection processing) with respect to the read image data so as to detect a document image of a punched document included in the read images read by the image-reading apparatus 200 (Step SE-3).

Then, the scan information acquiring unit 102e acquires scan information including the number of detected punched documents (presence or absence of punch holes in the document), and stores the scan information in the image data file 106a in association with the read image data (Step SE-4).

Then, the image acquiring unit 102b determines whether the scan by the image-reading apparatus 200 has ended (Step SE-5).

When the image acquiring unit 102b determines that the scan by the image-reading apparatus 200 has not ended (Step SE-5: No), the processing is shifted to Step SE-2.

On the other hand, when the image acquiring unit 102b determines that the scan by the image-reading apparatus 200 has ended (Step SE-5: Yes), the processing is shifted to Step SE-6.

Then, the scan information acquiring unit 102e aggregates scan information of the read images (image processing information) from the image data file 106a (Step SE-6).

Then, the temporal change data generating unit 102f reads temporal statistical information of the read images from the statistical information file 106c (Step SE-7).

Then, the temporal change data generating unit 102f generates temporal change data of a time to a punch hole detection rate based on the statistical information and the number of detected punched documents included in the image processing information (Step SE-8).

Then, the threshold determining unit 102g acquires a determination result of whether (1) or (2) is satisfied, based on the temporal change data and a predetermined threshold (recommended criterion threshold) as a verification of the recommended criterion, when (1): punch hole removal function setting is off, and punch hole detection rate is more than 10% for 1 month or more; and (2): punch hole removal function setting is on, and punch hole detection rate is less than 0.5% for 1 month or more (Step SE-9).

Here, an example of the temporal change data and the threshold in the embodiment will be explained with reference to FIG. 13. FIG. 13 is a diagram of an example of temporal change data and threshold in the embodiment.

Figure 13:
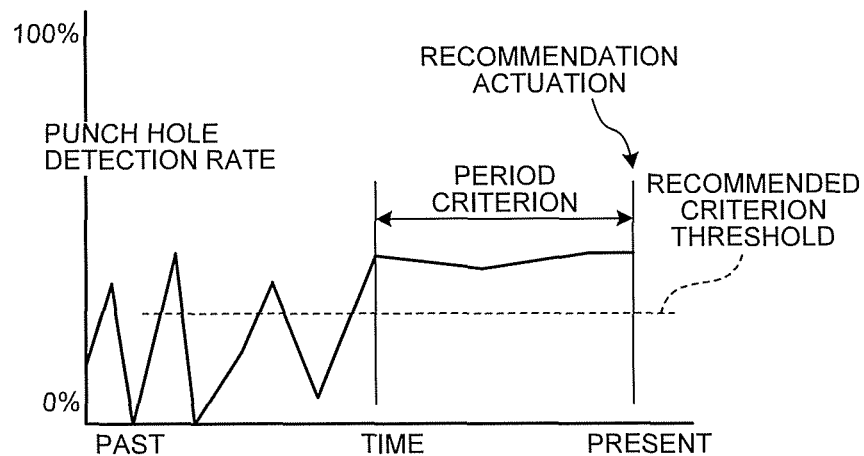
FIG. 13 is a diagram of an example of temporal change data and a threshold in the embodiment.

As illustrated in FIG. 13, in the embodiment, the temporal change data may be data where the temporal change of the punch hole detection rate of the document images from the past to the present is plotted, and the threshold may be a value of a recommended criterion threshold and a period criterion for determining continuity of the punch hole detection.

Returning to FIG. 12, the threshold determining unit 102g determines, based on the determination result, whether the verification (1) or (2) for the recommended criterion is established (Step SE-10).

Then, when the threshold determining unit 102g determines that the verification (1) and (2) for the recommended criterion are not established (Step SE-10: No), the processing is shifted to Step SE-13.

On the other hand, when the threshold determining unit 102g determines that the verification (1) or (2) for the recommended criterion is established (Step SE-10: Yes), the processing is shifted to Step SE-11.

Then, when the verification (1) for the recommended criterion is established, the information outputting unit 102h generates recommendation notification information for notifying a recommended set value to turn on the punch hole removal function; when the verification (2) for the recommended criterion is established, the information outputting unit 102h generates recommendation notification information for notifying a recommended set value to turn off the punch hole removal function (Step SE-11).

Then, the information outputting unit 102h causes the input/output unit 112 to display recommendation notification information for notifying the recommended set value of the punch hole removal function (Step SE-12).

Here, an example of the recommendation notification information in the embodiment will be explained with reference to FIG. 14. FIG. 14 is a diagram of an example of the recommendation notification information in the embodiment.

Figure 14:
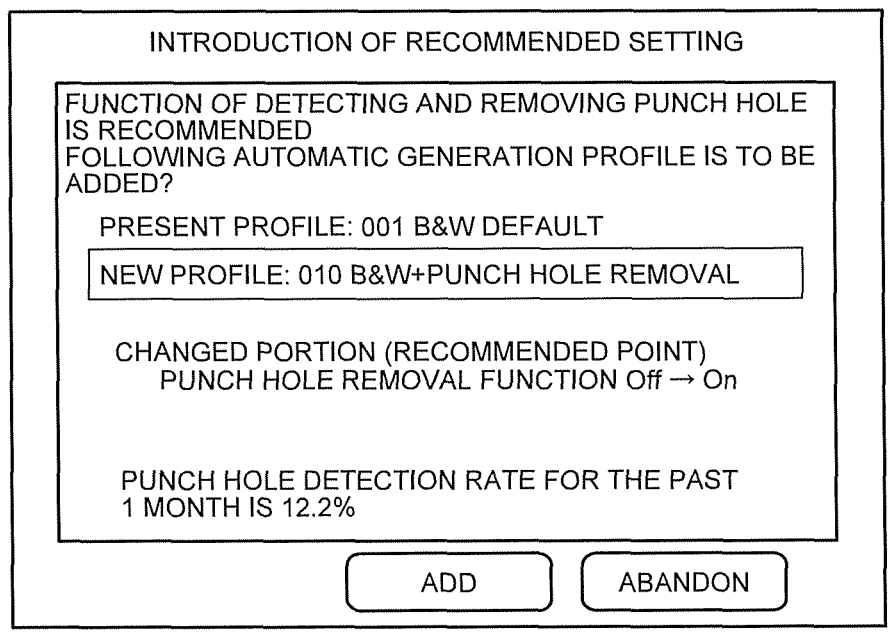
FIG. 14 is a diagram of an example of recommendation notification information of the embodiment.

As illustrated in FIG. 14, in the embodiment, any recommendation notification information for notifying a recommended set value of a punch hole removal function may be displayed in a text format.

Returning to FIG. 12, the updating unit 102i updates and saves the statistical information stored in the statistical information file 106c by use of scan information (Step SE-13), and the processing is ended.

Recommended Image Processing Profile Notification Processing (Blank Page Removal Function—Erect Correction Function Notification Processing)

Figure 15:
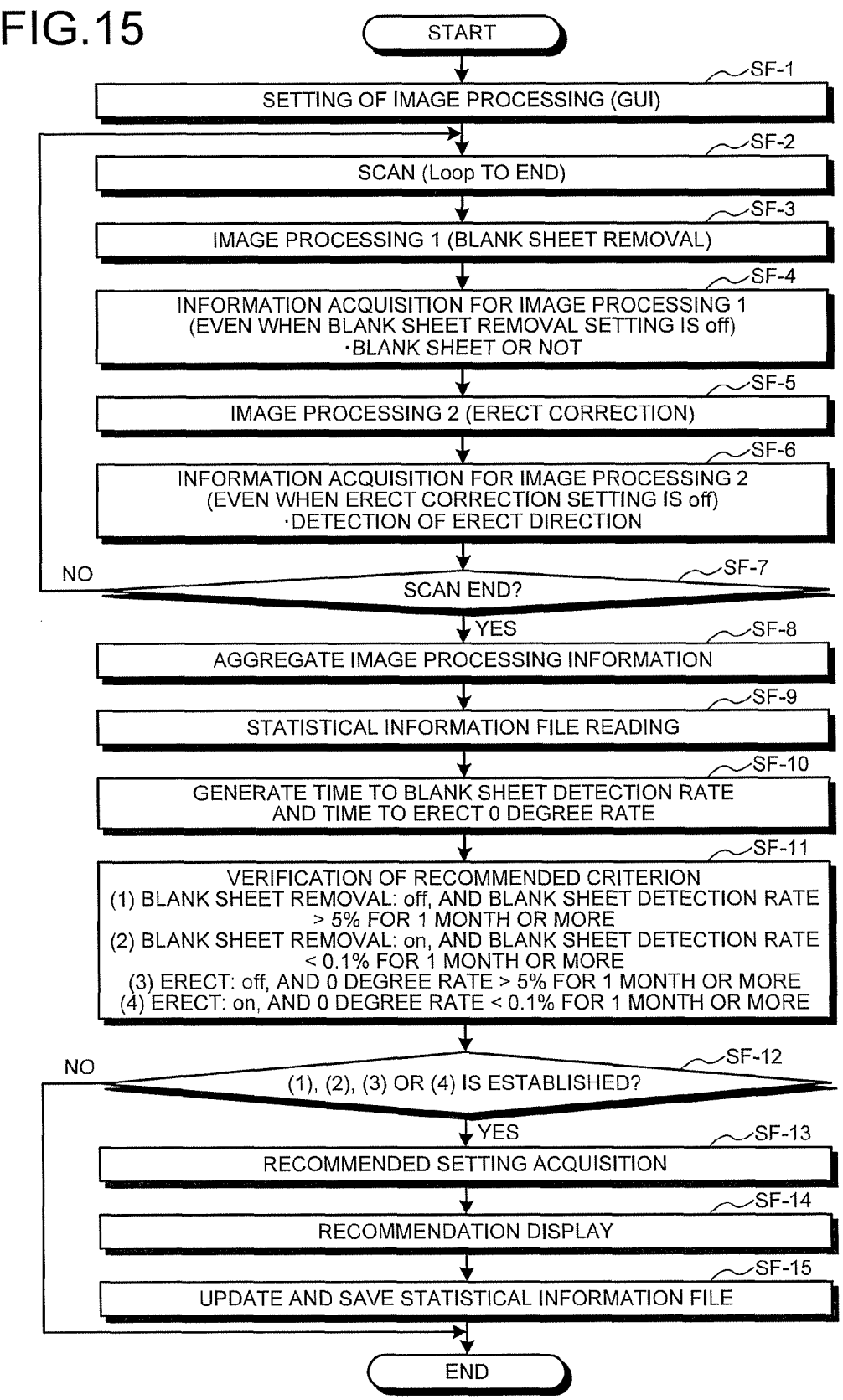
FIG. 15 is a flow chart of an example of processing in an image-processing apparatus of the embodiment.

Further, an example of recommended image processing profile notification processing in the embodiment will be explained with reference to FIG. 15 to FIG. 17. FIG. 15 is a flow chart of an example of processing in the image-processing apparatus 100 of the embodiment.

As illustrated in FIG. 15, first, the image-processing setting unit 102a causes the input/output unit 112 to display GUI for setting image processing with respect to the read image data. When a user inputs setting information of the blank page removal function and the erect correction function via the input/output unit 112, the image-processing setting unit 102a sets on/off of the blank page detection function and the erect direction detection function (Step SF-1).

Then, the image acquiring unit 102b controls scan with respect to a plurality (a large amount) of documents by the image-reading apparatus 200, acquires read image data read by the image-reading apparatus 200, and stores the read image data in the image data file 106a (Step SF-2).

Then, even when the user does not set the blank page removal function (namely, the setting is off), the scan information acquiring unit 102e performs image processing with respect to the read image data (blank page detection processing), thereby detecting a document image of a blank page document included in the read images read by the image-reading apparatus 200 (Step SF-3).

Then, the scan information acquiring unit 102e acquires scan information including the number of detected blank page documents, and stores the scan information in the image data file 106a in association with the read image data (Step SF-4).

Then, even when the user does not set the erect correction function (namely, the setting is off), the scan information acquiring unit 102e performs image processing with respect to the read image data (erect direction detection processing), thereby detecting the erect direction of the document image included in the read images read by the image-reading apparatus 200 (Step SF-5).

The erect direction may be any of five states including 0 degree, 90 degrees, 180 degrees, 270 degrees and "undetectable".

Then, the scan information acquiring unit 102e acquires scan information including the erect direction information of the document image, and stores the scan information in the image data file 106a in association with the read image data (Step SF-6).

Then, the image acquiring unit 102b determines whether the scan by the image-reading apparatus 200 has ended (Step SF-7).

Then, when the image acquiring unit 102b determines that the scan by the image-reading apparatus 200 has not ended (Step SF-7: No), the processing is shifted to Step SF-2.

On the other hand, when the image acquiring unit 102b determines that the scan by the image-reading apparatus 200 has ended (Step SF-7: Yes), the processing is shifted to Step SF-8.

Then, the scan information acquiring unit 102e aggregates scan information (image processing information) of the read images from the image data file 106a (Step SF-8).

Then, the temporal change data generating unit 102f reads temporal statistical information of the read images from the statistical information file 106c (Step SF-9).

Then, the temporal change data generating unit 102f generates temporal change data of a time to a blank page detection rate and temporal change data of a time to a non-correction rate of erect correction, based on the statistical information and the image processing information (Step SF-10).

Then, the threshold determining unit 102g acquires a determination result of whether the following (1), (2), (3) or (4) is satisfied, based on the temporal change data and a predetermined threshold (recommended criterion threshold) as a verification of recommended criterion, when (1): blank page removal function setting is off, and a blank page detection rate is more than 5% for 1 month or more; (2): blank page removal function setting is on, and a blank page detection rate is less than 0.1% for 1 month or more; (3): erect correction function setting is off, and a non-correction rate of erect correction is more than 5% for 1 month or more; and (4): erect correction function setting is on, and a non-correction rate of erect correction function is less than 0.1% for 1 month or more (Step SF-11).

Here, an example of the temporal change data and the threshold will be explained with reference to FIG. 16. FIG. 16 is a diagram of an example of recommended image processing profile notification processing in the embodiment.

Figure 16:
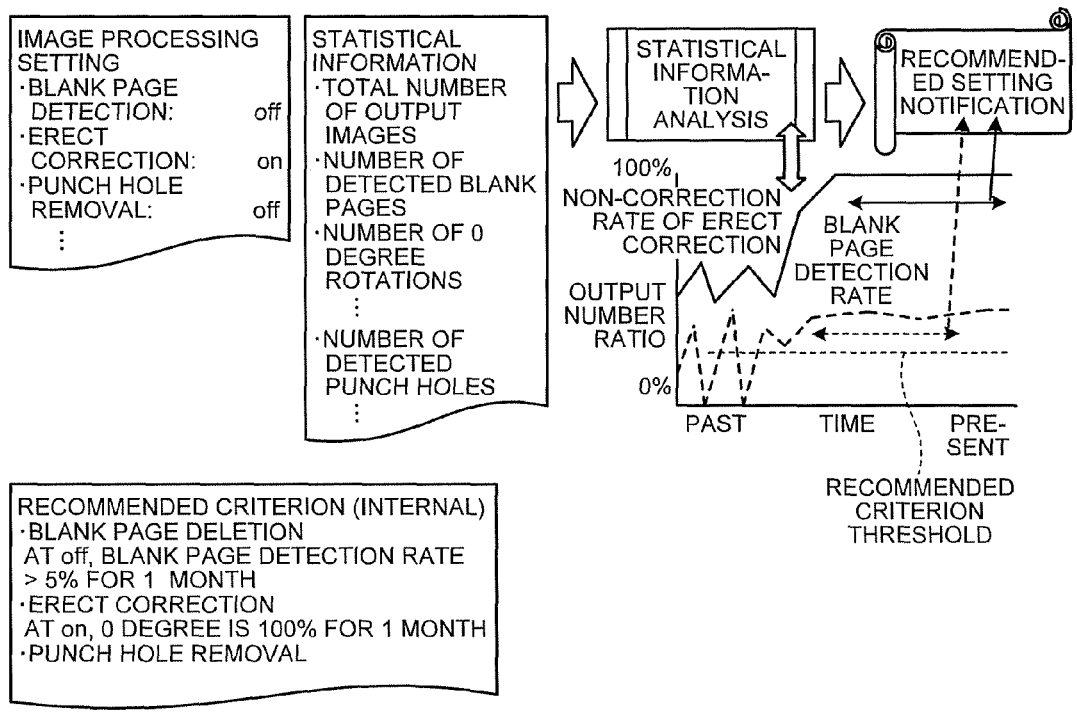
FIG. 16 is a diagram of an example of recommended image processing profile notification processing in the embodiment.

As illustrated in FIG. 16, in the embodiment, the temporal change data may be data where a temporal change of the blank page detection rate and non-correction rate of the erect correction of the document image from the past to the present are plotted. The threshold may be a value of recommended criterion threshold and a period criterion to determine continuity of an output number ratio equal to or more than the threshold.

Returning to FIG. 15, the threshold determining unit 102g determines whether the verification (1), (2), (3) or (4) of the recommended criterion is established based on the determination result (Step SF-12).

Then, when the threshold determining unit 102g determines that the verifications (1), (2), (3) and (4) of the recommended criteria are not established (Step SF-10: No), the processing is shifted to Step SF-15.

On the other hand, when the threshold determining unit 102g determines that the verification (1), (2), (3) or (4) of the recommended criterion is established (Step SF-10: Yes), the processing is shifted to Step SF-13.

Then, when the verification (1) of the recommended criterion is established, the information outputting unit 102h acquires recommendation notification information for notifying a recommended set value to turn on the blank page removal function. When the verification (2) of the recommended criterion is established, the information outputting unit 102h acquires recommendation notification information for notifying a recommended set value to turn off the blank page removal function. When the verification (3) of the recommended criterion is established, the information outputting unit 102h acquires recommendation notification information for notifying a recommended set value to turn on the erect correction function. And, when the verification (4) of the recommended criterion is established, the information outputting unit 102h acquires recommendation notification information for notifying a recommended set value to turn off the erect correction function (Step SF-13).

Then, the information outputting unit 102h causes the input/output unit 112 to display the recommendation notification information for notifying the recommended set value (Step SF-14).

Here, an example of the recommendation notification information in the embodiment will be explained with reference to FIG. 17. FIG. 17 is a diagram of an example of recommendation notification information in the embodiment.

Figure 17:
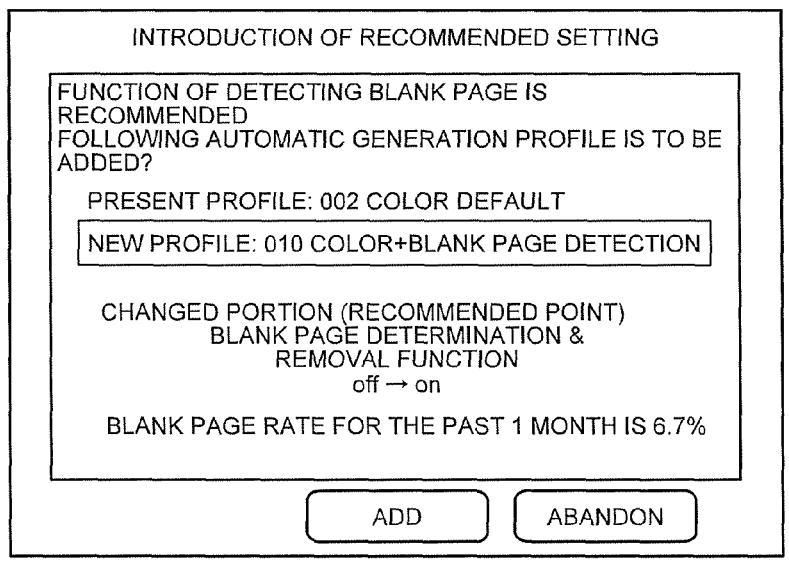
FIG. 17 is a diagram of an example of recommendation notification information of the embodiment.

As illustrated in FIG. 17, in the embodiment, the recommendation notification information for notifying the recommended set value of the blank page removal function may be displayed in a text format.

Returning to FIG. 15, the updating unit 102i updates and saves the statistical information stored in the statistical information file 106c by use of the scan information (Step SF-15), and the processing is ended.

Here, an example of the recommended image processing profile notification processing in the embodiment will be explained with reference to FIG. 16.

As illustrated in FIG. 16, in the embodiment, even when the blank page removal function (blank page deletion function) is off, it is possible to execute the blank page determination processing in the background and to perform monitoring.

Then, in the embodiment, if a blank page mixture rate with respect to the entire output images is stable from a certain time period, it is possible to determine that blank pages of a certain percentage are present and to issue a recommendation notification to turn the blank page determination function (blank page deletion function) from off to on.

Further in the embodiment, as illustrated in FIG. 16, when the rotational angle 0 degree of the document image is 100% for a certain time period while the erect correction function is on, it is possible to determine that a fixed service has begun from a certain time period and that the user aligns and sets the documents and to issue a recommendation notification to turn off the erect correction function.

On the other hand, in the embodiment, when it is possible to determine that the user sets the documents in the image-reading apparatus 200 without aligning the direction of the documents while the erect correction function is off, a recommendation notification may be issued to turn on the erect correction function.

In the embodiment, as explained above, since the preliminary operations relating to the erect correction function vary depending on users, the recommendation notification suitable for every user may be issued.

Further in the embodiment, each scan information correlates with image-processing setting information. And thus, image processing information may be acquired individually by controlling the image processing such that the image processing result can be recorded even if the image-processing setting is off.

In the embodiment, it is possible to set a recommended expectation value (have an expectation value) for the scan information regarding the occurrence number or the occurrence rate for every individual information, so as to determine whether each individual information is within the range of the recommended expectation value.

In the embodiment, when the individual image-processing setting is off or on and when it is preferable that at least one image-processing setting is replaced by on or off based on the recommendation determination, the determination set value may be displayed.

In this case, in the embodiment, the operator may be allowed to judge whether to change the part of the corresponding image-processing setting.

In this manner, in the embodiment, even when there is a function that is not used often by the user or a function that is not known by the user, the setting is notified (introduced) automatically based on the actual use by the user, and thus even an amateur can learn a further effective scanner usage.

Further in the embodiment, color determination processing is performed as image processing in the recommendation notification processing for the automatic color determination function. It is possible to record the automatic determination result when the automatic color determination function is on, and to record the output color when the same function is off.

In any of the color determination processing, the result (three states of color, gray or binary) may be recorded as the number of (common) outputs. Further, data of time to each color output rate may be generated as the temporal change data.

The color output rate (Rc) may be (color determination number/total output number)*100, the gray output rate (Rg) may be (gray determination number/total output number)*100, and the binary output rate (Rb) may be (binary determination number/total output number)*100.

Further in the embodiment, for determining a situation where the user utilizes evenly the respective color modes or for determining a situation where the output is performed automatically but substantially with any one color to scan a business form of the same type, the recommended criterion with respect to the automatic color determination may be verified.

Specifically, as the verification of the recommended criterion, it is possible to acquire a determination result of whether the following (1) or (2) is satisfied, when (1): the automatic color determination function setting is off, and $Rn>5\%$ for 1 month or more (n=c,g,b), and (2): the color determination is on, and, $R1>>Rp+Rq$ and $Rr>99\%$ for 1 month or more (here, (p,q,r) indicates a combination of c, g and b while $p \neq q \neq r$).

Further in the recommendation notification information acquisition, it is possible to acquire (generate) a profile to turn on the automatic color determination function. Or it is possible to acquire (generate) a profile to perform a fixed output in a color corresponding to Rp.

Further in the recommendation display, any expression and information matching the acquired recommendation notification information may be displayed to the user. In the embodiment, as an option, the gray case may be omitted (namely, it may be included in any of the color or the binary states).

Further in the embodiment, in the recommendation notification processing of the document crease-break correction function, it is possible to perform document crease-break detection processing as image processing and perform detection only in a case where the document crease-break detection correction function is off.

In the document crease-break detection processing, presence or absence of creases and breaks in the documents may be recorded. Further, data of time to the crease-break occurrence rate may be generated as temporal change data. The crease-break occurrence rate (R) may be (the number of images where creases and breaks are detected/total output numbers)*100.

Further, for determining a user utilization situation where damaged documents are often scanned or a user utilization situation where there are fewer damaged documents, verification of the recommended criterion may be performed.

Specifically, as the verification of the recommended criterion, the determination result of whether the following (1) is satisfied may be acquired, when (1): the document crease-break detection correction function is off, and a crease-break occurrence rate (R) is more than 5% for 1 month or more, or, the crease-break detection correction function is on, and a crease-break occurrence rate (R) is less than 0.5% for 1 month or more.

Further in the recommendation notification information acquisition, a profile where the document crease-break detection correction processing function is on may be acquired (generated); a profile where the document crease-break detection correction processing function is off may be acquired (generated).

Further in the recommendation display, any expression and information matching the acquired recommendation notification information may be displayed to the user.

In the embodiment, as an option, the processing may be executed by replacing the number of images where creases and breaks are detected with the number of creased/broken parts (in this case, since R may exceed 100%, the threshold is preset appropriately).

Further in the embodiment, a tab detection processing for detecting presence of a tab may be executed as image processing for an optional operation of deskew-crop function in recommendation notification processing of a function to switching the process of the tab part in a document (tab switching function).

In the tab switching function recommendation notification processing, a recommendation determination operation may be performed only when the deskew-crop function is on. For the scan information, the number of detected tabbed documents may be acquired.

In the recommendation display, recommendation notification information for notifying a recommended set value regarding clipping of a document image including a tab or clipping without including a tab may be displayed to the user.

Further in the embodiment, in a recommendation notification processing of a tab switching function, tab detection processing for determining presence of a tab may be executed as image processing, for an optional operation of the blank page deletion function.

In the tab switching function recommendation notification processing, the recommendation determination operation may be performed only when the blank page determination function is on. For the scan information, the number of detected tabbed documents may be acquired.

In the recommendation display, recommendation notification information for notifying a recommended set value for performing blank page determination including a tab or performing blank page determination without including a tab may be displayed to the user.

Further in the blank page determination, a periphery of a document has many noises of an area outside the document due to the influence of the clipping precision or a damaged document, and thus, an erroneous determination may be made easily. Therefore, the periphery is usually excluded from the object of determination.

However in the blank page determination in the embodiment, in a case of a tabbed document, the interior of the tab may be regarded usually as an area to be determined, since presence or absence of a character in the tab is important for the blank page determination.

Further in the embodiment, in the recommendation notification processing of a function to remove a texture pattern or a watermark (ground pattern) in a document, ground pattern detection processing to detect whether there is a ground pattern in the document may be executed as image processing. If there is any ground pattern, ground pattern removal processing to remove the ground pattern by image processing may be executed.

In a recommendation notification information acquisition, a profile to turn on the ground pattern detection removal function may be acquired, or a profile to turn off the ground pattern detection removal function may be acquired.

In the embodiment, the ground pattern detection processing may be performed as an option only when the output image is binary.

Further in the embodiment, as another option, the process for ground pattern removal processing may be switched depending on the output image, i.e., the image is binary, color or gray. In the embodiment, recommendation may be displayed independently for the binary, color or gray.

In a typical ground pattern removal, a scanned image is binarily outputted to be further subjected to an OCR analysis. Therefore, the ground pattern detection removal function recommendation notification processing in the embodiment is effective.

Further in the embodiment, in recommendation notification processing of a function for reducing moire fringes that occur at the time of scanning a halftone print, halftone detection processing and moire fringe reduction processing may be executed as image processing.

In the recommendation notification information acquisition, a profile to turn on the moire fringe reduction function may be acquired, or a profile to turn off the moire fringe reduction function may be acquired.

In a conventional business operation of reading images of a large amount of document sheets by an ADF double-sided image-reading apparatus 200, when a large amount of images are scanned, an operator is forced to put extra effort to check manually the errors in the scan result.

A specific example of the errors is unintended mixing of blank pages during a scan operation to handle usually the same type of business forms. In another example, a gray image can be mixed.

Further for example, skewed images can be mixed even if a standard size document is placed correctly on a document shooter. In addition to these examples, various types of errors can occur in spite of simplicity of the routine work by the user.

Further, in a conventional business operation to read a large amount of images of document sheets by the ADF double-sided image-reading apparatus 200, a large amount of images are scanned. In such a case, it is required to put effort in visually checking errors so as to find any influence on the images by temporal abnormality of the image-reading apparatus 200.

A specific example of the error is vertical streak noise appearing on the images, which is caused by the influence of dust inside the image-reading apparatus 200. Another example of the error is that the size of output image (in particular, in the conveying feed direction) can vary slightly due to the influence by the lifetime of a document-conveying roller or the like of the image-reading apparatus 200.

Further, the dirt of the document-conveying roller of the image-reading apparatus 200 is accumulated to cause a roller mark on the output image.

Further, in a conventional business operation of reading images of a large amount of document sheets with the ADF double-sided image-reading apparatus 200, a large amount of images are scanned, and errors in automatic detection such as double feeding (namely, design errors or errors relating to detection precision) can occur. Due to the influences of the errors, extra effort is required to visually checking and counting of the sheets to confirm if necessary images are obtained.

Examples of factors to create extra work for visual check or sheet counting by an operator include problems in automatic blank page deletion function, automatic document color determination function, automatic document size determination and deskew precision.

Other factors to create the extra work include a condition for cleaning a camera unit of the ADF image-reading apparatus 200, articles with limited service life (in particular, conveying feed roller or the like), and a condition for cleaning the feed roller.

Other factors to create extra work include an error relating to precision in the automatic multi-feed detection, any limitation (for example, a document having an adhesive label cannot be used), or a design error. Furthermore, if a user is not familiar with and thus does not use a convenient function, the user is forced to put extra effort into the operations.

In a conventional technique, due to the various factors, the operator is eventually forced to conduct a visual check even after solving the individual problems. Further in a conventional technique, there is a limitation in improving the precision of the respective functions with reference to the utilization form of the users.

Further in a conventional technique, even by improving the blank page determination, precisions in the remaining functions such as the deskew precision cannot be improved. Further in a conventional technique, there is a necessity of expecting various utilization forms to improve the precision in the individual function, and thus, sometimes the user is forced to switch the modes.

Therefore, the embodiment provides a method for reducing the burden of trials and errors in an unambiguous and simple manner from a technical viewpoint, so that a user who conducts a fixed business operation can be considerably freed from the burden in a way suitable for the utilization of the user.

Thereby in the embodiment, the burden on the operator is reduced in an unambiguous and simple manner regardless of various factors.

Further in the embodiment, even if there are many image processes, scan result information can be stored statistically for every image processing. Therefore, a substantially common mechanism can be applied to any image processing.

Further in the embodiment, the image-reading apparatus 200 can be applied to usage of the user. Therefore, even if the user has his/her characteristic business operation style, the alarm can be set in a simple manner to be suitable for the business operation of every user (how to use the image processing function, business forms to be scanned or the like).

Further in the embodiment, there is less necessity to change the processing depending on the types of image processing, and thus, the operation is less limited by the respective characteristics of the various image processing functions. This renders the operations simple and easy.

Other Embodiments

The embodiment of the present disclosure has been explained so far. Besides the foregoing embodiment, the present disclosure can also be carried out in various different embodiments within the scope of the technical idea described in the claims.

For example, the image-processing apparatus 100 may perform processing in a standalone mode, or may perform processing according to a request from a client terminal (separate from the image-processing apparatus 100) and then return the results of the processing to the client terminal.

Out of the processes explained in relation to the embodiment, all or some of the processes explained as being automatically performed may be manually performed, or all or some of the processes explained as being manually performed may be automatically performed by publicly known methods.

Besides, the process steps, the control steps, the specific names, the information including registered data for the processes or parameters such as search conditions, the screen examples, or the database configurations described or illustrated herein or the drawings can be appropriately changed if not otherwise specified.

The constituent elements of the image-processing apparatus 100 shown in the drawings are conceptual functions and do not necessarily need to be physically configured as shown in the drawings.

For example, all or any part of the processing functions included in the units of the image-processing apparatus 100, in particular, the processing functions performed by the control unit 102 may be implemented by the CPU or programs interpreted and executed by the CPU, or may be implemented by wired logic-based hardware.

The programs including programmed instructions for causing a computer to execute methods according to the present disclosure described later are recorded in non-transitory computer-readable recording media, and are mechanically read by the image-processing apparatus 100 as necessary. Specifically, the computer programs for giving instructions to the CPU to perform various processes in cooperation with an operating system (OS) are recorded in the storage unit 106 such as a ROM or an HDD. The computer programs are loaded into the RAM and executed, and constitute a control unit in cooperation with the CPU.

The computer programs may be stored in an application program server connected to the image-processing apparatus 100 via an appropriate network, and may be entirely or partly downloaded as necessary.

The programs according to the present disclosure may be stored in computer-readable recording media or may be formed as program products. The "recording media" include any portable physical media such as a memory card, a USB memory, an SD card, a flexible disc, a magneto optical disc (MO), a ROM, an erasable programmable read only memory (EPROM), an electrically erasable programmable read only memory (EEPROM), a compact disc read only memory (CD-ROM), a DVD, and a Blu-ray (registered trademark) disc.

The "programs" constitute data processing methods described in an appropriate language or by an appropriate describing method, and are not limited in format such as source code or binary code. The "programs" are not limited to singly-configured ones but may be distributed into a plurality of modules or libraries or may perform their functions in conjunction with another program typified by an OS. Specific configurations for reading the recording media by the units according to the embodiment, specific procedures for reading the programs, or specific procedures for installing the read programs may be well-known configurations or procedures.

The various databases and others stored in the storage unit 106 may be storage units such as any one, some, or all of a memory device such as a RAM or a ROM, a fixed disc device such as a hard disc, a flexible disc, and an optical disc, and may store any one, some, or all of various programs, tables, databases, and web page files for use in various processes and web site provision.

The image-processing apparatus 100 may be an information processing apparatus such as a well-known personal computer or work station, and appropriate peripherals may be connected to the information processing apparatus. The image-processing apparatus 100 may be embodied by providing the information processing apparatus with software (including programs, data, and the like) for implementing the methods according to the present disclosure.

Further, the specific modes of distribution and integration of the devices are not limited to the ones illustrated in the drawings but all or some of the devices may be functionally or physically distributed or integrated by a predetermined unit according to various additions and the like or functional loads. That is, the foregoing embodiments may be carried out in any appropriate combination or may be selectively carried out.

When an operator reads a large amount of document images with a scanner, the operator is forced to put extra effort into checking the scan result. The present disclosure makes it possible to reduce the work for an operator to perform a manual operation or the like.

According to the present disclosure, an operator is required only to observe notice information regarding any of scan information and thus can be freed from burden to visually check an image output result.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-processing apparatus comprising:
   a memory that stores standard sheet size information and size tolerance information; and
   a processor coupled to the memory, wherein
   the processor executes a process comprising:
      clipping document image data of a document image by deskew processing and crop processing on read image data of read images read by an image-reading apparatus;
      determining whether the document image corresponds to a standard sheet, based on the standard sheet size information and the size tolerance information, and
      acquiring scan information of the read images read by the image-reading apparatus when determining that the document image corresponds to the standard sheet,
   wherein the memory stores temporal statistical information of the read images read by the image-reading apparatus, and
   the process further comprises:
      calculating an aspect ratio of the document image included in the read images read by the image-reading apparatus;
      generating temporal change data of a time to the aspect ratio for each standard sheet based on the statistical information and the aspect ratio; and
      outputting alarm information for notifying an abnormal state in a roller of the image-reading apparatus when determining that the temporal change data fail to satisfy a threshold.

2. An image-processing apparatus including a document scanner, the image-processing apparatus comprising:
   a memory that stores temporal statistical information of read images read by an image-reading apparatus; and
   a processor coupled to the memory, wherein
   the processor executes a process comprising:
      detecting a document image of a blank page document included in the read images read by the image-reading apparatus to acquire the number of detected blank page documents;

generating temporal change data of a time to a blank page detection rate based on the temporal statistical information and the number of detected blank page documents, and outputting recommendation notification information for notifying a recommended set value of a blank page removal function included in image processing with respect to read image data of the read images when determining that the temporal change data fail to satisfy a threshold, wherein the process further comprises:

detecting the document image of a tabbed document included in the read images read by the image-reading apparatus to acquire the number of detected tabbed documents;

generating the temporal change data of a time to a tab detection rate based on the temporal statistical information and the number of detected tabbed documents; and outputting the recommendation notification information for notifying the recommended set value, included in the image processing, on whether to perform a blank page detection including the tab when determining that the temporal change data fail to satisfy the threshold.

3. An image-processing apparatus comprising:

a memory that stores standard sheet size information and size tolerance information; and a processor coupled to the memory, wherein the processor executes a process comprising:

clipping document image data of a document image by deskew processing and crop processing on read image data of read images read by an image-reading apparatus;

determining whether the document image corresponds to a standard sheet, based on the standard sheet size information and the size tolerance information, and acquiring scan information of the read images read by the image-reading apparatus when determining that the document image corresponds to the standard sheet, wherein the process further comprises:

detecting the document image of a tabbed document included in the read images read by the image-reading apparatus to acquire the number of detected tabbed documents;

generating temporal change data of a time to a tab detection rate based on statistical information and the number of detected tabbed documents; and outputting recommendation notification information for notifying a recommended set value on whether to perform clipping of the tabbed document image when determining that the temporal change data fail to satisfy a threshold.

4. An image-processing method comprising:

clipping document image data of a document image by deskew processing and crop processing on read image data of read images read by an image-reading apparatus;

determining whether the document image corresponds to a standard sheet, based on standard sheet size information and size tolerance information stored in a memory; and acquiring scan information of the read images read by the image-reading apparatus when determining that the document image corresponds to the standard sheet, wherein the memory stores temporal statistical information of the read images read by the image-reading apparatus, and the process further comprises:

calculating an aspect ratio of the document image included in the read images read by the image-reading apparatus;

generating temporal change data of a time to the aspect ratio for each standard sheet based on temporal statistical information of the read images read by the image-reading apparatus and the aspect ratio, the statistical information being stored in the memory; and outputting alarm information for notifying an abnormal state in a roller of the image-reading apparatus when determining that the temporal change data fail to satisfy a threshold.

* * * * *